US012474801B1

(12) United States Patent
Vaze et al.

(10) Patent No.: US 12,474,801 B1
(45) Date of Patent: Nov. 18, 2025

(54) INDUCTIVE STYLUS SENSING

(71) Applicant: Apple Inc., Cupertino, CA (US)

(72) Inventors: Sagar R. Vaze, San Jose, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/409,660

(22) Filed: Jan. 10, 2024

Related U.S. Application Data

(60) Provisional application No. 63/493,235, filed on Mar. 30, 2023.

(51) Int. Cl.
*G06F 3/041* (2006.01)
*G06F 3/044* (2006.01)
*G06F 3/046* (2006.01)

(52) U.S. Cl.
CPC ........ *G06F 3/04166* (2019.05); *G06F 3/0446* (2019.05); *G06F 3/046* (2013.01); *G06F 2203/04106* (2013.01)

(58) Field of Classification Search
CPC ............... G06F 3/04166; G06F 3/0446; G06F 2203/04106
See application file for complete search history.

(56) References Cited

U.S. PATENT DOCUMENTS

| | | | |
|---|---|---|---|
| 8,624,847 B2 * | 1/2014 | Ely | G06F 3/0445 345/169 |
| 9,411,462 B2 | 8/2016 | Wright et al. | |
| 9,692,442 B1 | 6/2017 | Kutz et al. | |
| 9,807,876 B2 | 10/2017 | Catchpole | |
| 10,031,590 B2 | 7/2018 | Bakken et al. | |
| 10,324,577 B2 | 6/2019 | Sainis et al. | |
| 10,459,541 B2 | 10/2019 | Bell | |
| 10,871,828 B2 | 12/2020 | Ligtenberg et al. | |
| 11,983,365 B1 * | 5/2024 | Ling | G06F 3/03545 |
| 12,039,138 B1 * | 7/2024 | Kim | G06F 3/0443 |
| 2003/0217871 A1 * | 11/2003 | Chao | G06F 3/046 178/18.01 |
| 2004/0055793 A1 * | 3/2004 | Chao | G06F 3/046 178/18.01 |

(Continued)

*Primary Examiner* — Ariel A Balaoing
(74) *Attorney, Agent, or Firm* — Kubota & Basol LLP

(57) ABSTRACT

Electrodes configurable for capacitive touch sensing or inductive sensing are disclosed. The electrodes are formed from a plurality of tiled (connected) sense pixels, each sense pixel including two or four conductive elements. The conductive elements within the plurality of sense pixels of an electrode are connected to form conductive pathways within the electrode. These conductive pathways enable each electrode to be configured as a touch electrode for single-ended or differential capacitive touch sensing, or into one or two loops for inductive sensing. In pixels with four conductive elements, two conductive elements are formed with a comb shape for maximizing current conduction during inductive sensing and maximizing capacitive coupling during touch sensing, and two conductive elements are formed as bypasses. In electrodes formed from sense pixels with four conductive elements, each conductive pathway within the electrode is formed as an alternating series of comb-shaped conductive elements and bypasses.

20 Claims, 22 Drawing Sheets

(56) References Cited

U.S. PATENT DOCUMENTS

| | | | | |
|---|---|---|---|---|
| 2010/0328249 | A1* | 12/2010 | Ningrat | G06F 3/046 345/174 |
| 2011/0069022 | A1* | 3/2011 | Yokota | G06F 3/046 345/173 |
| 2015/0029132 | A1* | 1/2015 | Yeh | G06F 3/046 345/174 |
| 2015/0084899 | A1* | 3/2015 | Park | G06F 3/041 345/173 |
| 2017/0139544 | A1* | 5/2017 | Yamada | G06F 3/0443 |
| 2018/0032173 | A1* | 2/2018 | Kim | G06F 3/041 |

* cited by examiner

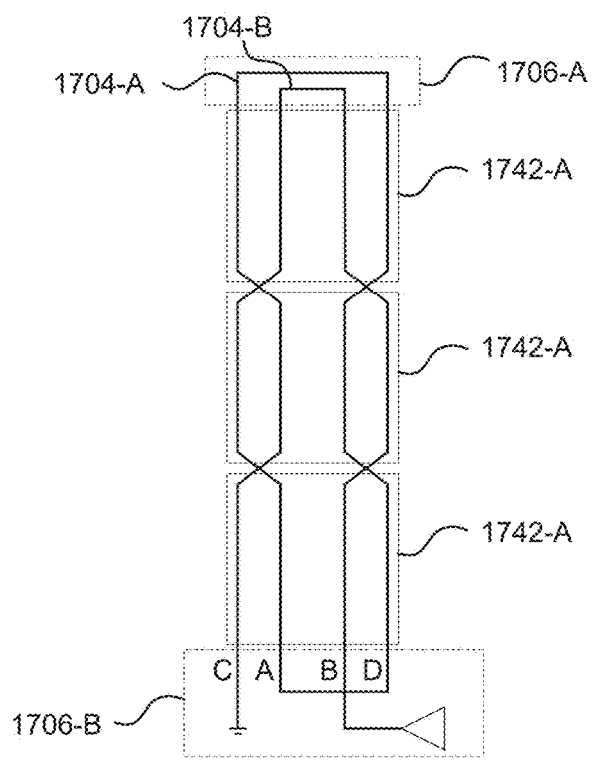 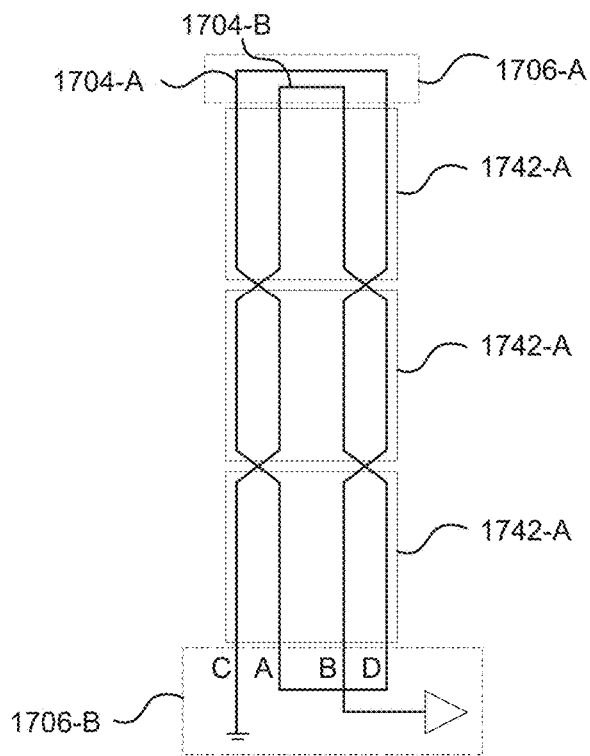
FIG. 17E-4    FIG. 17E-5

INDUCTIVE STYLUS SENSING

CROSS-REFERENCE TO RELATED APPLICATIONS

This application claims the benefit of U.S. Provisional Application No. 63/493,235, filed Mar. 30, 2023, the content of which is incorporated herein by reference in its entirety for all purposes.

FIELD OF THE DISCLOSURE

This relates generally to touch and proximity detection and, more specifically, to inductive stylus detection using electrodes formed on a panel that can be configured for either capacitive touch sensing or inductive sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels) in an on-cell touch (OCT) architecture.

Inductive touch or proximity sensors use the principle of electromagnetic (EM) induction to detect the touch or proximity of objects such as a stylus, and can be employed as an alternative to, or in addition to, capacitive touch and proximity sensing to detect objects in conditions where moisture or contaminants may be present. However, inductive sensing can require additional sensing and shielding layers, increase device thickness, and introduce noise.

BRIEF SUMMARY OF THE DISCLOSURE

This relates generally to touch and proximity detection and, more specifically, to inductive stylus detection using electrodes formed on a panel that can be configured for either capacitive touch sensing or inductive sensing. In some examples, sense pixels including two or four conductive elements oriented in a column (or row) orientation are the building blocks for forming column (or row) electrodes from a plurality of tiled (connected) sense pixels. The two or four conductive elements within the plurality of sense pixels of an electrode can be connected to form two or four conductive pathways within the electrode. These two or four conductive pathways enable each electrode to be configured as a touch electrode for single-ended or differential capacitive touch sensing, or into one or two loops for inductive sensing. In pixels with four conductive elements, two conductive elements can be formed with a comb shape, with comb shafts for maximizing current conduction during inductive sensing, and comb teeth for maximizing capacitive coupling during touch sensing, and two conductive elements can be formed as bypasses. In electrodes formed from sense pixels with four conductive elements, each conductive pathway within the electrode can be formed as an alternating series of comb-shaped conductive elements and bypasses. Although inductive sensing is often referred to herein as inductive stylus sensing, the disclosure is applicable to objects other than styluses that are capable of inductively interacting with a panel of electrodes configured for inductive sensing.

In other examples, the column (or row) electrodes can be formed from solid bars of conductive material rather than a series of tiled sense pixels, and the bars can either be configured as individual capacitive touch electrodes, or configured into loops (using pairs of bars) for inductive sensing. In still other examples, metal mesh wires oriented in a one direction on one layer can be grouped into separate columns (or rows), and some wires in each group can be connected together to form a capacitive touch electrode, while other wires in that group can be connected to form a loop for inductive sensing. In addition, metal mesh wires oriented in a second direction on another layer can also be grouped into separate rows (or columns), with some wires in each group connected together to form a capacitive touch electrode, and other wires in that group connected to form a loop for inductive sensing.

BRIEF DESCRIPTION OF THE DRAWINGS

FIG. 16D-2 is a symbolic illustration of two columns of conductive elements routed through a single column electrode of tiled sense pixels and configured as a single-loop inductive sensor according to some examples of the disclosure.

FIG. 16D-3 is a symbolic illustration of two columns of conductive elements routed through a single column electrode of tiled sense pixels and configured for performing single loop inductive stylus sensing with an active receive stylus according to some examples of the disclosure.

FIG. 16D-4 is a symbolic illustration of two columns of conductive elements routed through a single column electrode of tiled sense pixels and configured for performing single loop inductive stylus sensing with an active transmit stylus according to some examples of the disclosure.

FIG. 17E-1 is a symbolic illustration of four columns of conductive elements routed through a single column electrode of tiled sense pixels and configured as a differential capacitive touch transmit (drive) electrode according to some examples of the disclosure.

FIG. 17E-2 is a symbolic illustration of four columns of conductive elements routed through a single column electrode of tiled sense pixels and configured as a single-ended capacitive touch receive (sense) electrode according to some examples of the disclosure.

FIG. 17E-3 is a symbolic illustration of four columns of conductive elements routed through a single column electrode of tiled sense pixels and configured for performing two loop inductive stylus sensing according to some examples of the disclosure.

FIG. 17E-4 is a symbolic illustration of four columns of conductive elements routed through a single column electrode of tiled sense pixels and configured for performing two loop inductive stylus sensing with an active receive stylus according to some examples of the disclosure.

FIG. 17E-5 is a symbolic illustration of four columns of conductive elements routed through a single column electrode of tiled sense pixels and configured for performing two loop inductive stylus sensing with an active transmit stylus according to some examples of the disclosure.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch and proximity detection and, more specifically, to inductive stylus detection using electrodes formed on a panel that can be configured for either capacitive touch sensing or inductive sensing. In some examples, sense pixels including two or four conductive elements oriented in a column (or row) orientation are the building blocks for forming column (or row) electrodes from a plurality of tiled (connected) sense pixels. The two or four conductive elements within the plurality of sense pixels of an electrode can be connected to form two or four conductive pathways within the electrode. These two or four conductive pathways enable each electrode to be configured as a touch electrode for single-ended or differential capacitive touch sensing, or into one or two loops for inductive sensing. In pixels with four conductive elements, two conductive elements can be formed with a comb shape, with comb shafts for maximizing current conduction during inductive sensing, and comb teeth for maximizing capacitive coupling during touch sensing, and two conductive elements can be formed as bypasses. In electrodes formed from sense pixels with four conductive elements, each conductive pathway within the electrode can be formed as an alternating series of comb-shaped conductive elements and bypasses. Although inductive sensing is often referred to herein as inductive stylus sensing, the disclosure is applicable to objects other than styluses that are capable of inductively interacting with a panel of electrodes configured for inductive sensing.

In other examples, the column (or row) electrodes can be formed from solid bars of conductive material rather than a series of tiled sense pixels, and the bars can either be configured as individual capacitive touch electrodes, or configured into loops (using pairs of bars) for inductive sensing. In still other examples, metal mesh wires oriented in a one direction on one layer can be grouped into separate columns (or rows), and some wires in each group can be connected together to form a capacitive touch electrode, while other wires in that group can be connected to form a loop for inductive sensing. In addition, metal mesh wires oriented in a second direction on another layer can also be grouped into separate rows (or columns), with some wires in each group connected together to form a capacitive touch electrode, and other wires in that group connected to form a loop for inductive sensing.

Figure 1A:
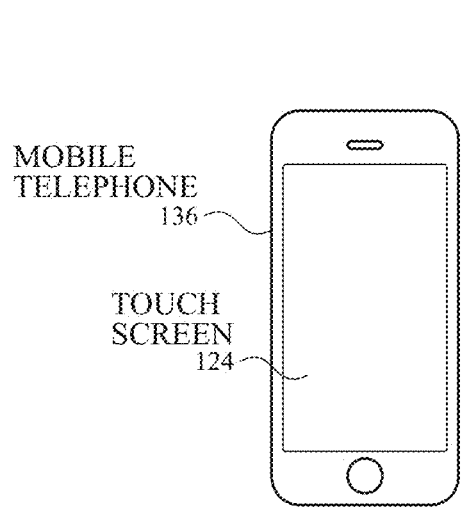
FIGS. 1A-1E illustrate example systems that can use inductive and capacitive sensing techniques according to examples of the disclosure.
Figure 1B:
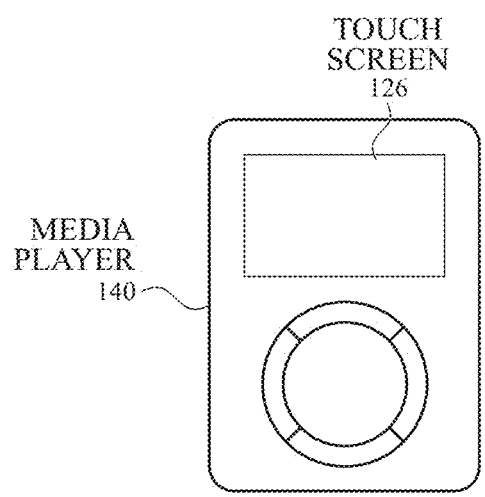
Figure 1C:
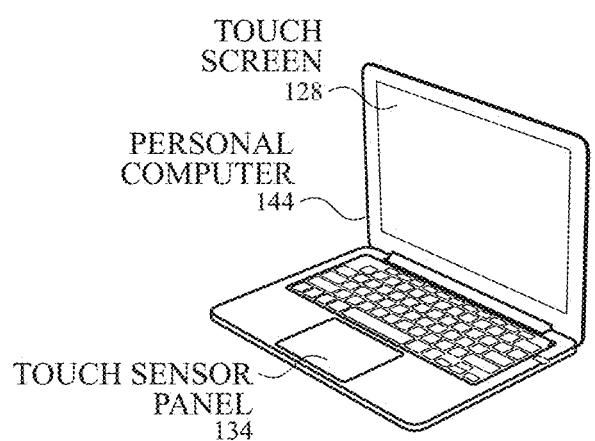
Figure 1D:
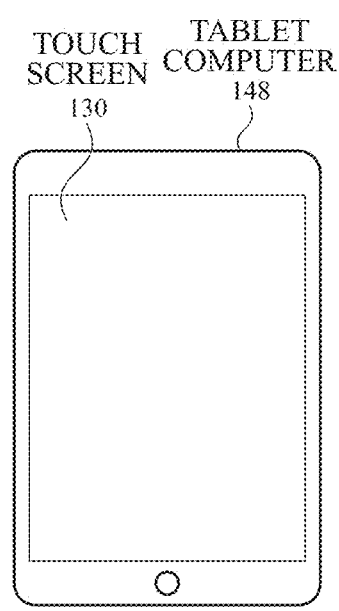
Figure 1E:
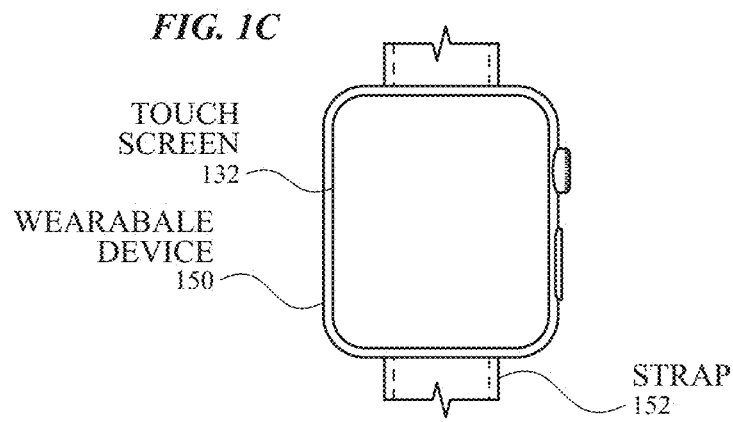

FIGS. 1A-1E illustrate example systems that can use inductive and capacitive sensing techniques according to examples of the disclosure. FIG. 1A illustrates an example mobile telephone 136 that includes a touch screen 124 that can use inductive and capacitive sensing techniques according to examples of the disclosure. FIG. 1B illustrates an example digital media player 140 that includes a touch screen 126 that can use inductive and capacitive sensing techniques according to examples of the disclosure. FIG. 1C illustrates an example personal computer 144 that includes a touch screen 128 and a touch sensor panel 134 (e.g., a trackpad) that can use inductive and capacitive sensing techniques according to examples of the disclosure. FIG. 1D illustrates an example tablet computing device 148 that includes a touch screen 130 that can use inductive and capacitive sensing techniques according to examples of the disclosure. FIG. 1E illustrates an example wearable device 150 that includes a touch screen 132 and can be attached to a user using a strap 152 and that can use inductive and capacitive sensing techniques according to examples of the disclosure. It is understood that inductive and capacitive sensing techniques can be implemented in other devices, including future devices not yet in the marketplace. Additionally, it should be understood that although the disclosure herein primarily focuses on touch screens, the disclosure of inductive and capacitive sensing techniques can be implemented for devices including touch sensor panels (and displays) that may not be implemented as a touch screen.

In some examples, touch screens 124, 126, 128, 130 and 132 and touch sensor panel 134 can be based, in one configuration, on self-capacitance. A self-capacitance based touch system can include self-capacitance electrodes arranged in rows and columns (e.g., as described below with reference to FIG. 4) that may cross over each other on different layers (in a double-sided configuration) or may be adjacent to each other on the same layer. Each row or column can form a self-capacitance touch electrode. For example, a touch screen can include a plurality of individual self-capacitance touch electrodes, each row or column electrode identifying or representing a unique X or Y location (e.g., a touch node) on the touch screen at which touch or proximity is to be sensed, and each self-capacitance touch electrode being electrically isolated from the other self-capacitance touch electrodes in the touch screen/panel. During operation, a self-capacitance touch electrode can be stimulated with an alternating current (AC) waveform, and the self-capacitance to ground of the touch electrode can be measured. As an object approaches the touch electrode, the self-capacitance to ground of the touch electrode can change (e.g., increase). This change in the self-capacitance of the touch electrode can be detected and measured by the touch sensing system to determine the positions of one or more objects when they touch, or come in proximity to, the touch screen. In some examples, a touch screen can support multi-touch, single touch, projection scan, etc., touch functionality.

In some examples, touch screens 124, 126, 128, 130 and 132 and touch sensor panel 134 can be based, in one configuration, on mutual capacitance. A mutual capacitance based touch system can include electrodes arranged as drive and sense lines (e.g., as described below with reference to FIG. 4) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panel 134 can be based on mutual capacitance, self-capacitance and/or inductive sensing. The electrodes can be arranged in rows and columns (e.g., as in row touch electrodes 404 and column touch electrodes 406 in touch screen 400 in FIG. 4), or in another pattern. The electrodes can be configurable for mutual capacitance, self-capacitance or inductive sensing, or a combination of mutual, self-capacitance and inductive sensing. For example, in one mode of operation, electrodes can be configured to switch between sensing mutual capacitance between electrodes and performing inductive sensing on the electrodes. In another mode of operation, electrodes can be configured to switch between sensing self-capacitance on electrodes and performing inductive sensing on the electrodes.

Figure 2:
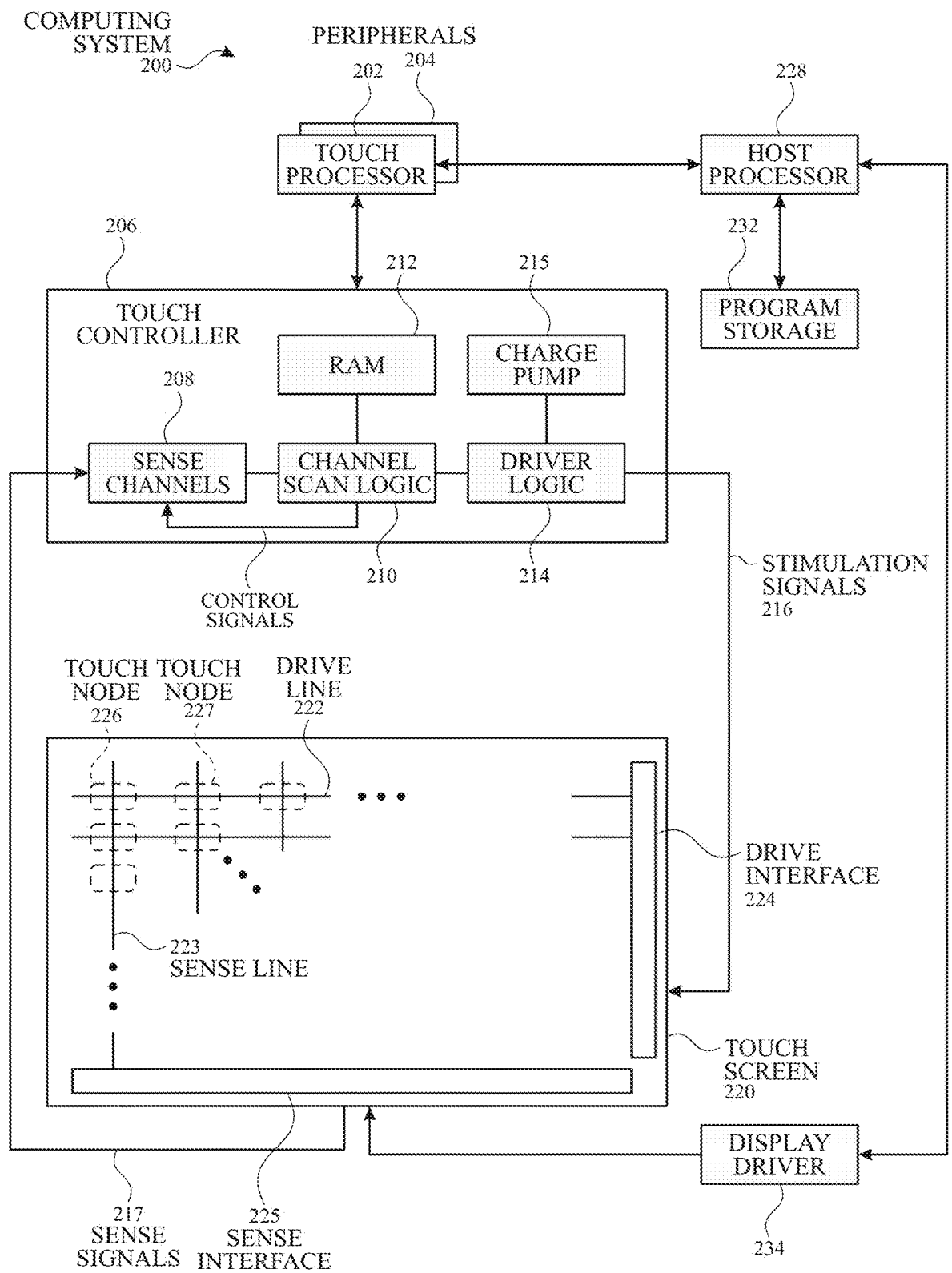
FIG. 2 illustrates an example computing system including a touch screen that can use inductive and capacitive sensing techniques according to examples of the disclosure.

FIG. 2 illustrates an example computing system including a touch screen that can use inductive and capacitive sensing techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

In the illustrated example of FIG. 2, touch screen 220 is a mutual capacitance touch screen with a drive interface 224 coupled to drive lines 222, and a sense interface 225 coupled to sense lines 223, with touch nodes occurring at the intersections of the drive and sense lines. However, in other examples of FIG. 2, touch screen 220 is a self-capacitance touch screen with drive/sense interfaces coupled to both rows and columns. In addition, the drive/sense lines of the mutual capacitance example, or the rows/columns of the self-capacitance example, can be reconfigured by touch controller 206 for inductive sensing, as will be described in further detail below. It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI) and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, EM, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, EM or infrared wired or wireless propagation medium.

Touch screen 220 can be used to derive touch information at multiple discrete locations of the touch screen, referred to herein as touch nodes or electrodes. Touch screen 220 can include touch sensing circuitry that can include a mutual capacitance sensing medium having a plurality of drive lines 222 and a plurality of sense lines 223, or a plurality of row and column self-capacitance electrodes, or a plurality of switches and the like to connect various drive lines, sense lines, rows or columns for inductive sensing. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
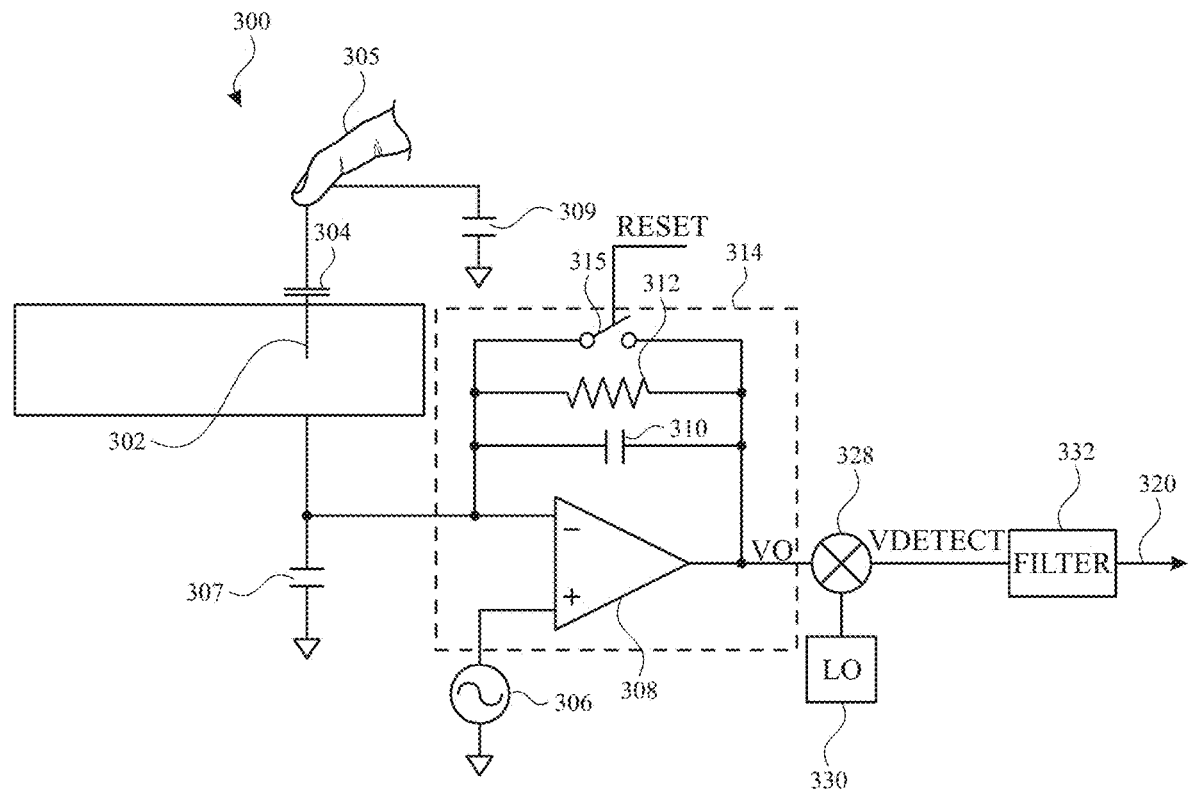
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit corresponding to a self-capacitance measurement of a touch electrode 302 and sensing circuit 314 (e.g., corresponding to a sense channel 208) according to examples of the disclosure. Touch electrode 302 can correspond to a touch electrode 404 or 406 of touch screen 400 or a touch electrode 408 of touch screen 402. Touch electrode 302 can have an inherent self-capacitance to ground associated with it, and also an additional self-capacitance to ground that is formed when an object, such as finger 305, is in proximity to or touching the electrode. The total self-capacitance to ground of touch electrode 302 can be approximated as capacitance 304 and can be much smaller than the body capacitance 309 and thus can dominate the overall ground capacitance. Touch electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch electrode 302 induced by a finger or object either touching or in proximity to the touch sensor panel. The output voltage amplitude of amplifier 308 is approximately Vac*(1+XFB/(XCS+XCSNS)), where XFB, XCS and XCSNS are the impedances of the feedback network, capacitors 307 and 304, respectively, at the frequency of Vac. The output of the amplifier 308 can be demodulated at the frequency of stimulus signal Vac (homodyne or synchronous detection) by demodulator 328 and then integrated (or averaged) by filter 332. The resulting output 320 can be used by a processor to determine the presence of a proximity or touch event, or the output can be inputted into a discrete logic network to determine the presence of a proximity or touch event. Note that in some examples, demodulator can be an I/Q demodulator. In some examples, the demodulator can be in the digital domain, where the output of amplifier 308 could be digitized first by an ADC before performing digital demodulation.

Figure 3B:
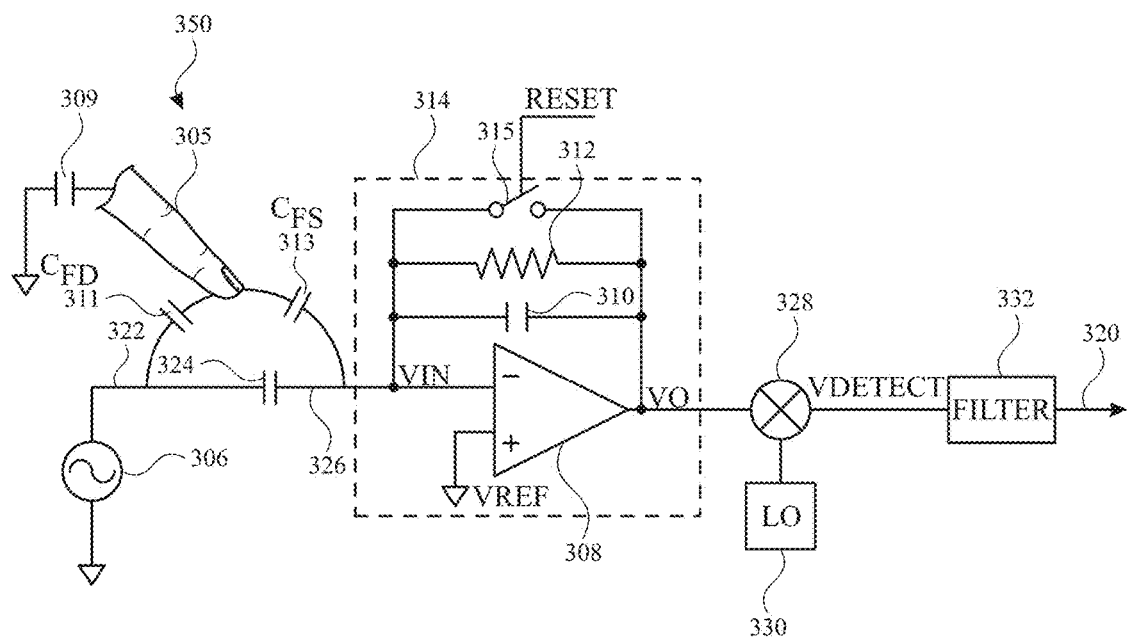
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger 305 or object approaches the touch node created by the intersection of drive line 322 and sense line 326, mutual capacitance 324 can change (e.g., decrease) (e.g., due to capacitive coupling indicated by capacitances CFD 311 and CFS 313, which can be formed between drive line 322, finger 305 and sense line 326). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310, and the impedance of mutual capacitance 324. The output of the amplifier 308 is demodulated at the frequency of stimulus signal Vac (homodyne or synchronous detection) by demodulator 328 and then integrated (or averaged) by filter 332. Note that in some examples, demodulator can be an I/Q demodulator. In some examples, the demodulator (or I/Q demodulator) can be in the digital domain, where the output of amplifier 308 can be digitized first by an ADC before performing demodulation and filtering.

Referring back to FIG. 2, in some examples, touch screen 220 can be an integrated touch screen in which touch sensing circuit elements of the touch sensing system can be integrated into the display pixel stack-ups of a display (e.g., on-cell touch). The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
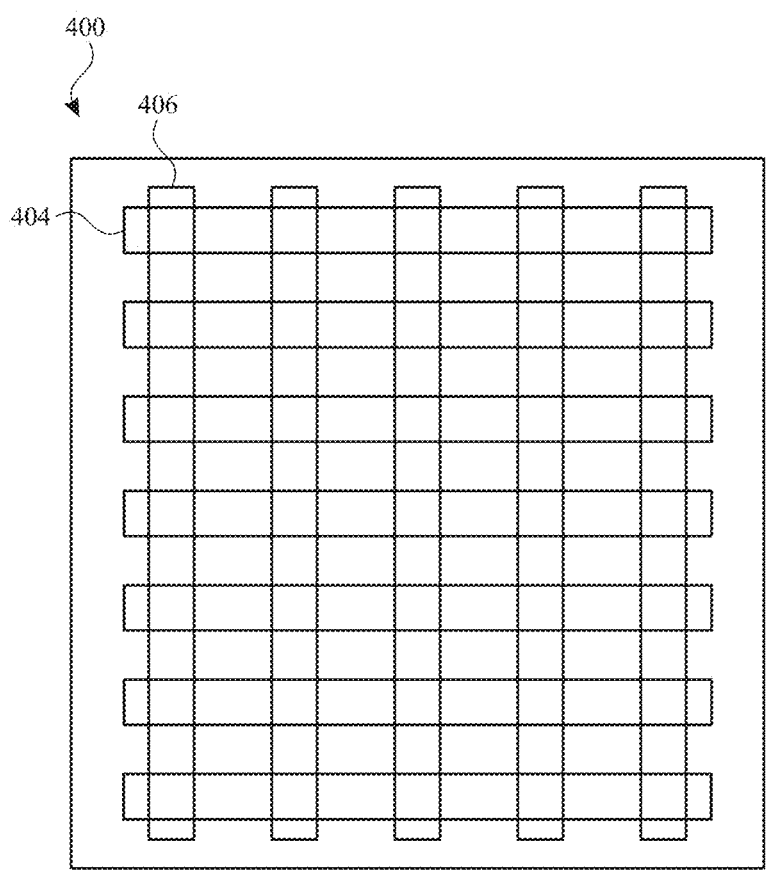
FIG. 4 illustrates touch screen with touch electrodes arranged in rows and columns according to examples of the disclosure.

FIG. 4 illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4. In various examples, the electrodes can be formed on the same side or opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangle-shaped, it should be understood that other electrode shapes and structures (e.g., diamond-, square-, stripe- or circle-shaped electrodes connected by jumpers or vias) are possible.

Figure 5:
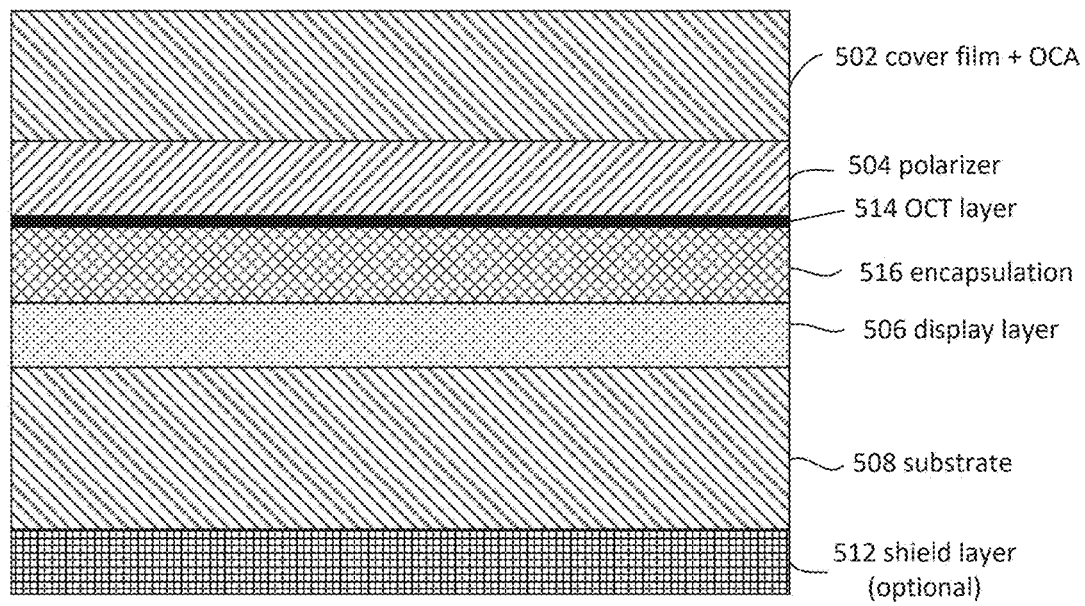
FIG. 5 illustrates a cross-section of an exemplary touch screen according to some examples of the disclosure.

FIG. 5 illustrates a cross-section of an exemplary touch screen 500 according to some examples of the disclosure. In some examples, the touch screen 500 can have an "on-cell" touch (OCT) layer 514 in which the touch electrodes are overlaid on the display layer 506 in close proximity (e.g., within 5, 10, 13, 15, etc. micrometers of each other), for example. In some examples, the touch screen 500 can include a cover film and an optically clear adhesive 502, a polarizer 504, the OCT layer 514, encapsulation layer 516, display layer 506, a dielectric (substrate) layer 508, and an optional shield layer 512.

In some examples, OCT layer 514 can form one or more touch electrodes of the touch screen. In some examples, the touch electrodes can be disposed in rows and columns like touch electrodes 404 and 406 illustrated in FIG. 4. In some examples, the touch electrodes can be formed from a metal mesh material. In some examples, the touch electrodes can be formed from a transparent or substantially transparent conductive material, such as ITO, AZO, and the like so that an image displayed on the display can be visible to the user through OCT layer 514.

In some examples, the display layer 506 of touch screen 500 can further include display components such as OLEDs and thin-film transistors (TFTs). During operation of the touch screen to display an image, display circuitry can apply voltages to the display circuits of various display pixels of the touch screen 500 corresponding to the image to be displayed.

The touch screen 500 can further include dielectric (substrate) layer 508, for example. In some examples, dielectric (substrate) layer 508 can include a material that is resistant to oxidization and other corrosion and can prevent oxidization and corrosion of the materials in display layer 506 during device manufacturing and/or operation.

In some examples, touch screen 500 can further include optically clear adhesive 502. In some examples, optically clear adhesive 502 can be used to adhere the polarizer 504 to a cover material (e.g., a cover glass or another cover material). Optically clear adhesive 502 can be (e.g., substantially) transparent to enable viewing of an image displayed by a display (e.g., including cathode 512) through the optically clear adhesive 502. Polarizer 504 can include materials with optical properties to enhance the quality of the images presented by the display.

The OCT layer 514 may be located between the polarizer 504 and an encapsulation layer 516. The OCT layer 514, as discussed above, may include touch sensors in close proximity to each other, which may be configured for touch sensing, or configured to form loops for inductive sensing. The encapsulation layer 516 may be used to prevent external moisture or oxygen from permeating into the light emitting elements of the display (e.g., the LCD or OLED display of display layer 506).

In some embodiments, the touch screen 500 optionally includes a ferrite shield layer 512. The ferrite shield layer 512 may include a ceramic material made of a metal oxide.

The metal oxide may be, for example, an iron oxide such as hematite $Fe_2O_3$ or magnetite $Fe_3O_4$. The material may be a soft ferrite, such as a manganese-zinc ferrite or a nickel-zinc ferrite, or a hard ferrite, such as a strontium ferrite, a barium ferrite or a cobalt ferrite. Alternatively, the ferrite layer may be designed as ferrite polymer composite comprising a distribution of ferrite particles in a polymer matrix. The ferrite shield layer 512 may be electrically conducting or electrically non-conducting. The ferrite shield layer 512 may shield the touch screen 500 from unwanted signals and noise, which may prevent the reduction of inductive coupling signals. However, in some embodiments, the ferrite shield layer 512 may cause interference with magnetic components (e.g., a magnetic compass).

In some embodiments, touch screen 500 may be a touch screen for a foldable device (e.g., a foldable smartphone or a foldable tablet). In such embodiments, it may be advantageous to use the OCT layer 514 as the capacitive and inductive sensing layer to prevent unwanted thickness and dead zones that can result from a separate inductive sensing layer and ferrite shield layer 512, both of which may be split into two parts at the fold area. In some embodiments, the OCT layer 514 may be used in conjunction with the ferrite shield layer 512, to prevent the signals in the touch screen 500 from diminishing.

Figure 6:
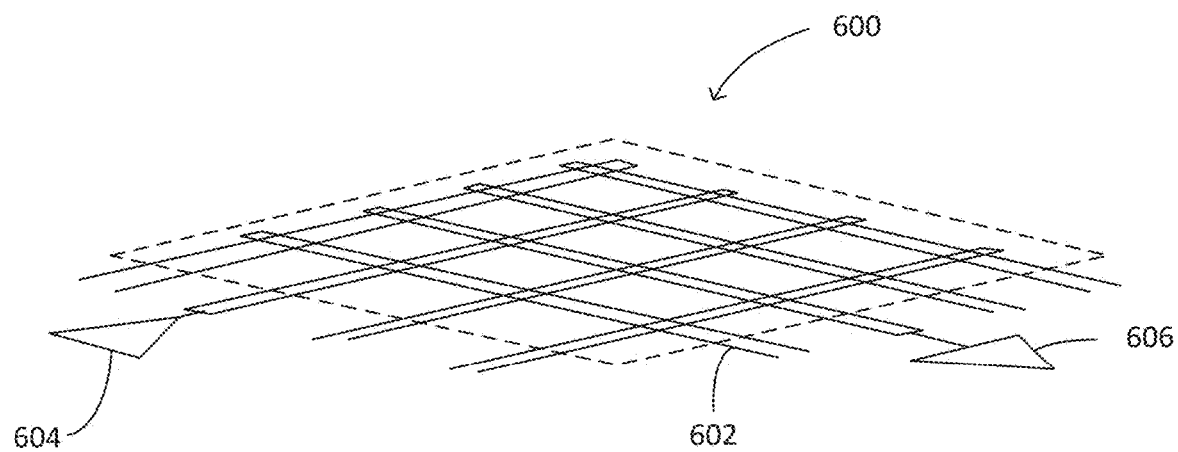
FIG. 6 is an embodiment of an OCT sensing layer where the conductive elements of the OCT sensing layer are used for touch sensing according to some examples of the disclosure.

FIG. 6 is an embodiment of an OCT layer 600 where the electrodes 602 of the OCT layer 600 are used for touch sensing according to some examples of the disclosure. Note that although various examples of the disclosure may be described herein in the context of OCT, the scope of this disclosure is also applicable to touch screens with touch sensor arrays that are not integrated with a display, or non-display touch sensor panels (e.g., trackpads), both of which can include conductive elements (e.g., electrodes 602 shown in FIG. 6). In some embodiments, the electrodes 602 are orientated as row-column type capacitive sensors, such that the electrodes 602 are oriented in a grid-like pattern, which is discussed in further detail in FIG. 7. The electrodes 602 may be electrodes configured for self-capacitance and/or mutual capacitance, as described in FIGS. 3A and 3B. The electrodes 602 may be connected to a driver 604, configured to generate stimulation signals through the electrodes 602. The electrodes 602 may also be connected to an amplifier 606, configured to sense and amplify changes in capacitance on the electrodes 602.

Figure 7:
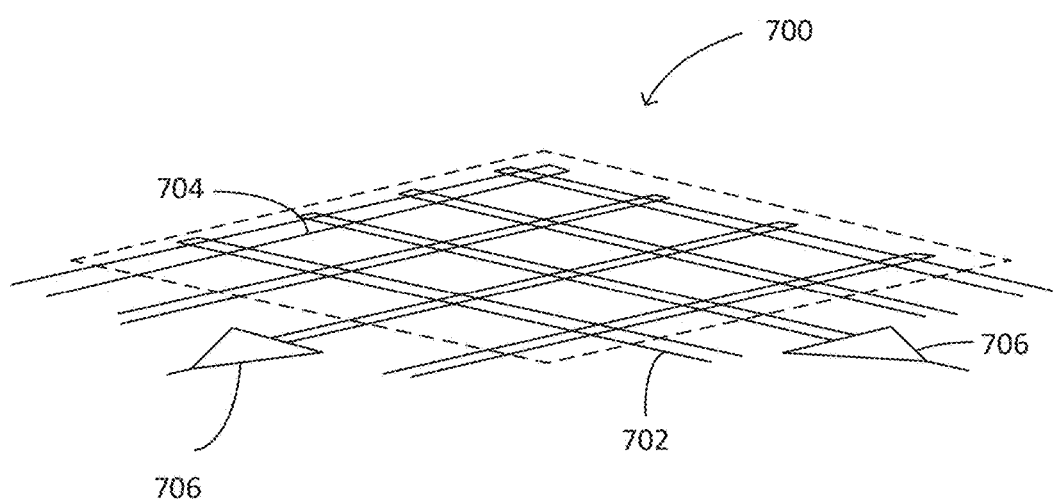
FIG. 7 is an embodiment of an OCT sensing layer, wherein the conductive elements of the OCT sensing layer are used for inductive sensing according to some examples of the disclosure.

FIG. 7 is an embodiment of an OCT layer 700, wherein the electrodes 702 of the OCTlayer 700 are used for inductive sensing according to some examples of the disclosure. Note that although various examples of the disclosure may be described herein in the context of OCT, the scope of this disclosure is also applicable to touch screens with touch sensor arrays that are not integrated with a display, or non-display touch sensor panels (e.g., trackpads), both of which can include the electrodes 702 shown in FIG. 7. OCT layer 700 may include row electrodes 702 and column electrodes 704. In some embodiments, inductive sensing loops are formed from multiple separate row electrodes 702 or multiple separate column electrodes 704. In some embodiments, loops may be formed within each row or column electrode. Each column and/or row loop may be connected to a voltage amplifier 706. In some embodiments, the OCT layer 700 may be oriented as row-column type capacitive sensors, as described in FIG. 6, and also include loops for inductive sensing.

Figure 8:
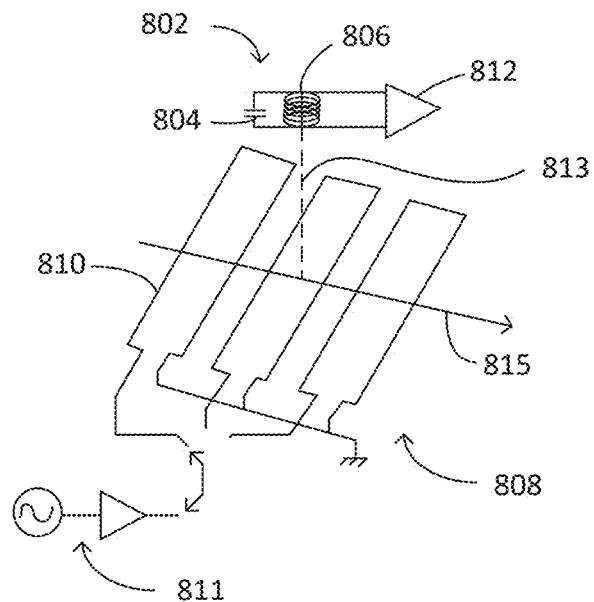
FIG. 8 illustrates an embodiment of an active receive stylus in communication with an inductive OCT sensor on a touch screen according to some examples of the disclosure.
Figure 9:
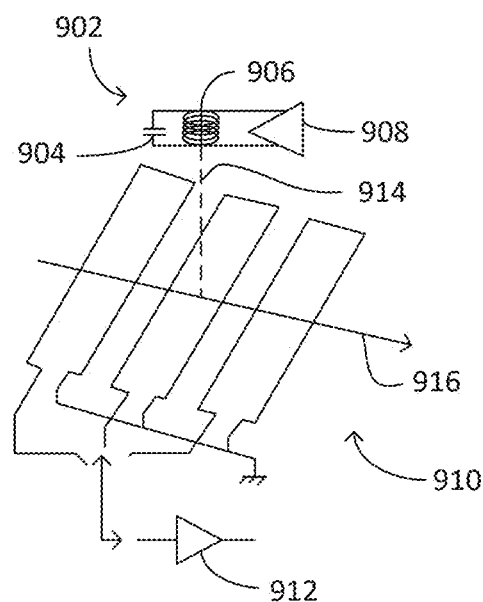
FIG. 9 illustrates an embodiment of an active transmit stylus in communication with an inductive OCT sensor according to some examples of the disclosure.

FIG. 8 illustrates an embodiment of an active receive stylus in communication with an OCT layer 808 configured for inductive sensing according to some examples of the disclosure. FIG. 9 illustrates an embodiment of an active transmit stylus in communication with an OCT layer 910 configured for inductive sensing according to some examples of the disclosure. An active stylus, as used herein, either includes a driver to generate a constantly changing EM field in the stylus that induces a current in a loop formed in the OCT layer, or includes an amplifier to detect and amplify current induced in a tank circuit in the stylus from an EM field generated in a loop formed in the OCT layer. The OCT layer can be configured to mitigate the inductive signal losses caused by the higher resistances of a metal mesh or ITO touch sensing layer, as will be explained below.

In some embodiments shown in FIG. 8, the active stylus may be an active receive stylus 802. The active receive stylus 802 may include a capacitor 804 and an inductor 806 to form a tank circuit. OCT layer 808 may be configured into inductive loops 810 formed between and/or in the row and column electrodes of the OCT layer. In some embodiments, OCT layer 808 may include a current driver 811 to drive current through the electrode loops formed in the OCT layer 808. The current flowing through the inductive loops 810 in OCT layer 808 cause EM fields to be generated in those loops, and eddy currents can be induced (see reference number 813) in the tank circuit of the stylus when the stylus and OCT layer are in sufficient proximity to each other. The eddy currents may be sensed and amplified by amplifier 812. Information indicating the time and optionally the strength of the eddy currents generated in the stylus can be communicated back to the apparatus of the OCT layer 808, either by wired or wireless means. Arrow 815 indicates an example direction of scan of OCT layer 808, where current is driven onto each electrode loop formed in the OCT layer in a known sequence. By identifying the time at which eddy currents were detected in the stylus, and knowing the timing of the stimulation of each electrode loop, the location of the stylus can be determined.

In some embodiments shown in FIG. 9, the active stylus may be an active transmit stylus 902. The active transmit stylus 902 may include a capacitor 904 and an inductor 906 to form a tank circuit. The OCT layer 910 may be configured into inductive loops formed between and/or in the row and column electrodes of the OCT layer. The tank circuit in the active transmit stylus 902 may be driven by signal generator 908, which creates a tuned frequency oscillator in the active transmit stylus 902. The tuned frequency oscillator may cause an alternating current to flow through the inductor 906 and generate a constantly changing EM field. When the active transmit stylus 902 is in sufficient proximity to the OCT layer 910, eddy currents are induced (see reference number 914) in the loops of the OCT layer. The touch screen may include a voltage detect amplifier 912 that may detect the presence of the eddy currents. Arrow 916 indicates an example direction of scan of OCT layer 910, where the voltage detect amplifier 912 is connected to each electrode loop in OCT layer 910 to detect eddy current (if any) in a known sequence. By identifying the location of the electrode loop(s) at which eddy currents were detected in the OCT layer 910, the location of the stylus can be determined.

In some embodiments, the stylus may be passive such that the stylus includes a resonant tank circuit without a current driver. In such embodiments, the OCT layer may perform both the receive and transmit functions to detect and transmit the location of the stylus. The passive stylus may include a capacitor and an inductor to form a resonant tank circuit. The OCT layer may be configured into inductive loops formed between and/or in the row and column electrodes of the OCT layer. The OCT layer may include a current driver and tuned frequency oscillator to sequentially drive current through the electrode loops formed in the OCT layer. The current flowing through the electrode loops in the OCT layer cause EM fields to be generated in those loops, and eddy currents can be induced in the resonant tank circuit of the stylus when the stylus and OCT layer are in sufficient proximity to each other. The eddy currents in the stylus generate an opposing EM field that disrupts the magnetic field generated by the electrode loops in the OCT layer, changing the current flowing through the loops and the magnitude and/or frequency of the oscillation in those loops. In other words, the load on the tuned frequency oscillator increases, and the magnitude of the oscillation is reduced, while the frequency is increased, and one or both of these changes can be detected at the OCT layer. By identifying the electrode loops(s) at which changes to the magnitude and/or frequency of the oscillation in the tuned frequency oscillator were detected, the location of the passive stylus can be determined.

Figure 10:
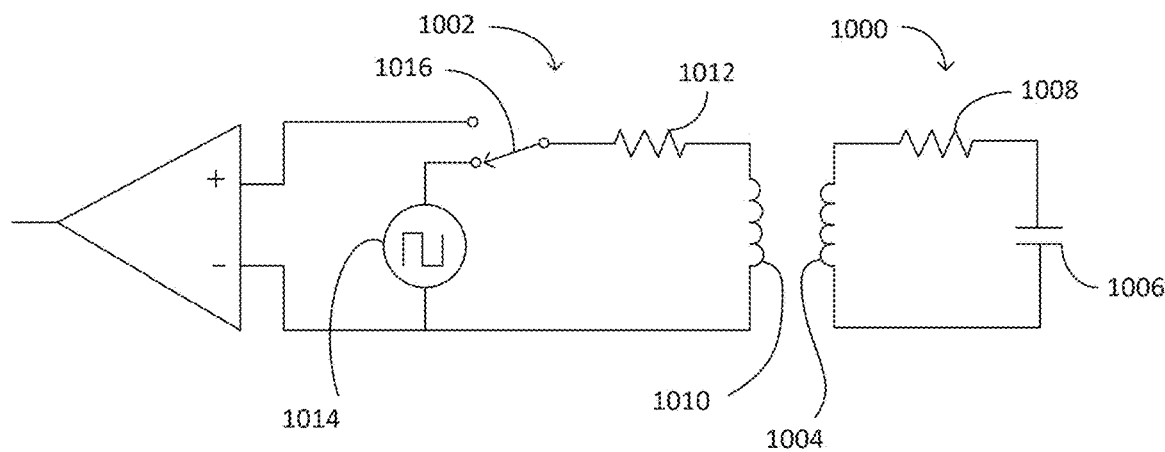
FIG. 10 is an embodiment of a passive stylus circuit operable with an OCT sensing layer circuit according to some examples of the disclosure.

FIG. 10 is an embodiment of a passive stylus circuit representation 1000 operable with an OCT layer circuit representation 1002 according to some examples of the disclosure. The passive stylus circuit representation 1000 may include an inductor 1004, a capacitor 1006, and a resistor 1008. In one example, the inductor 1004 may have an inductance of 85 pH, the capacitor 1106 a capacitance of 670 pF, and the resistor a resistance of 10. The passive stylus circuit representation 1000 may not have a power source, thus no current driver. The inductor 1004 may interact with the inductor 1010 on the OCT layer circuit representation 1002 by creating eddy currents as described above. In some embodiments, the coefficient of coupling between the two inductors may be 0.06. The OCT layer circuit representation 1002 is a representation of an electrode loop in the OCT layer along with an associated tuned frequency oscillator and a measurement amplifier. In some embodiments, inductor 1010 may have an inductance of 0.43 pH. The OCT layer circuit representation 1002 may also include a resistor 1012 and a signal generator 1014. The resistor 1012 may have a resistance of 2000Ω, which may represent the high resistance of the OCT layer due to metal mesh or ITO traces, as discussed with reference to FIG. 7. Signal generator 1014 may be configured to drive the tuned frequency oscillator, and the amplifier may be configured to sense changes to the magnitude and/or frequency of the oscillation in the tuned frequency oscillator. In some examples, signal generator 1014 may be a 5 Vpp signal generator. In this embodiment, switch 1016 can selectively switch the electrode loop between being driven as a tuned frequency oscillator and being sensed for changes in magnitude and/or frequency of oscillation by the amplifier.

Figure 11A:
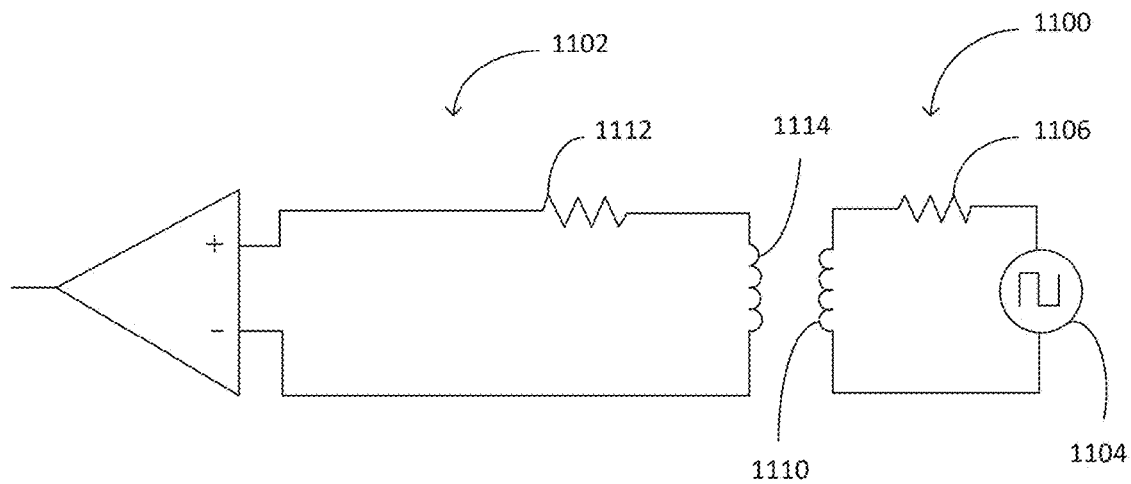
FIG. 11A is an embodiment of an active stylus circuit operable with an OCT sensing layer circuit according to some examples of the disclosure.

FIG. 11A is an embodiment of an active transmit stylus circuit representation 1100 operable with an OCT layer circuit representation 1102 according to some examples of the disclosure. Note that FIG. 11A corresponds to FIG. 9. In some embodiments, the active transmit stylus may be actively driven by signal generator 1104. In some embodiments, the signal generator 1104 may be a 5V signal generator. The active transmit stylus circuit representation 1100 may also include a resistor 1106 and an inductor 1110. The OCT layer circuit representation 1102 may include a resistor 1112 with a high resistance (e.g., 2000 ohms, 1500 ohms, or 3000 ohms) representative of the high resistance of metal mesh or ITO traces. The OCT layer circuit representation 1102 may also include an inductor 1114, into which eddy currents can be induced when the active transmit stylus is in close proximity to the inductor 1114. Inductor 1114 may have an inductance of 0.43 pH and inductor 1110 may have an inductance of 85 pH. The coefficient of coupling between the two inductors may be 0.06.

Figure 11B:
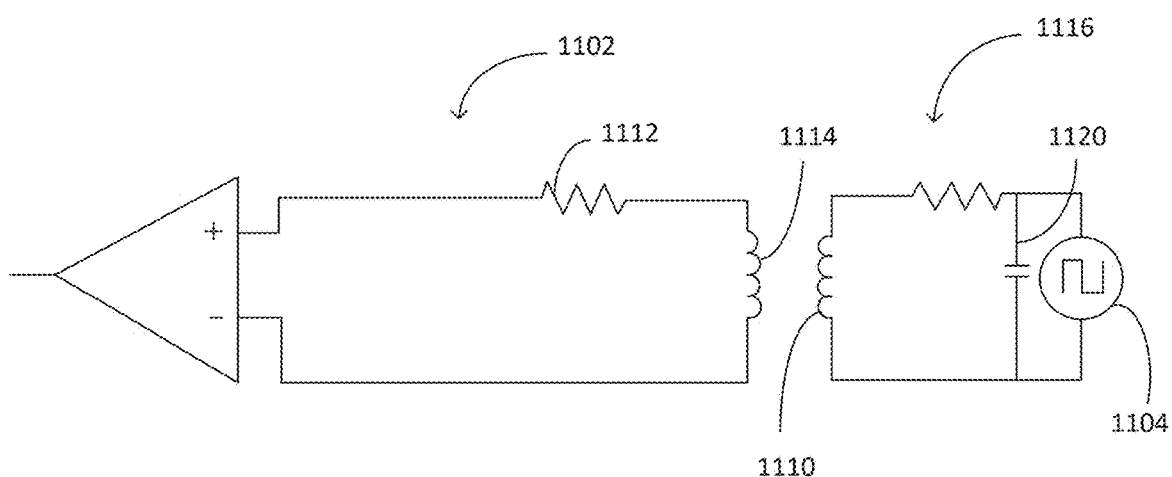
FIG. 11B is an embodiment of an active stylus circuit with a resonant circuit including a capacitor that is operable with an OCT sensing layer circuit according to some examples of the disclosure.

In some embodiments, a resonant circuit may be added in the active transmit stylus to save power. FIG. 11B is an embodiment of an active transmit stylus circuit representation 1116 with a resonant circuit created by the inclusion of capacitor 1120 that is operable with electrode loops in an OCT layer according to some examples of the disclosure. In some embodiments, the capacitor 1120 may have a capacitance of 4.3 nF. When resonance is not utilized, as in FIG. 11A, the signal generator 1104 is supplying all the power within the active transmit stylus, including power coupled into the electrode loops and all other power. However, by utilizing a resonant circuit along with the signal generator 1104, the signal generator 1104 need only supply the power that is coupled into the electrode loops of the OCT layer, and the capacitor 1120 can supply the remaining power needed by the circuit. One drawback of using a resonant circuit is that the use of the capacitor 1120 may limit the operating frequencies to the fixed frequencies supported by the inductor 1110 and capacitor 1120 combination. To overcome this limitation, in some embodiments, multiple resonant capacitors that are switchable may be used to enable multiple operating points and frequencies. In some embodiments, resonant capacitor 1120 may be a stable oscillator with a defined Q, an Armstrong oscillator, or other positive feedback oscillators.

As described above, some touch sensors can be formed as row and column electrodes, and in applications where transparency is not required, the row and column electrodes can be formed as relatively wide conductive traces from material such as copper. These wide traces of low resistance material can have sheet resistances on the order of 1 mΩ per square and trace resistances of 4Ω. However, in applications such as touch screens where transparency is required, the touch sensors may be formed as row and column electrodes of thin conductive material (e.g., a metal mesh) and/or higher resistance conductive material such as Indium Tin Oxide (ITO) that can be, in one example, 4 microns wide with a 100 micron pitch, with a sheet resistance of 0.06 ohms per square and a trace resistance of 3000 ohms. When configured for inductive sensing according to various examples of the disclosure, these metal mesh or ITO touch sensors can be configured as single-turn loops, and their high trace resistances can produce high resistance loops that can limit inductance and produce undesirable energy losses in inductive coupling. However, some embodiments of the disclosure can overcome, reduce or avoid this problem of high trace resistances and low inductive energy transfer, as will be described below.

Figure 12A:
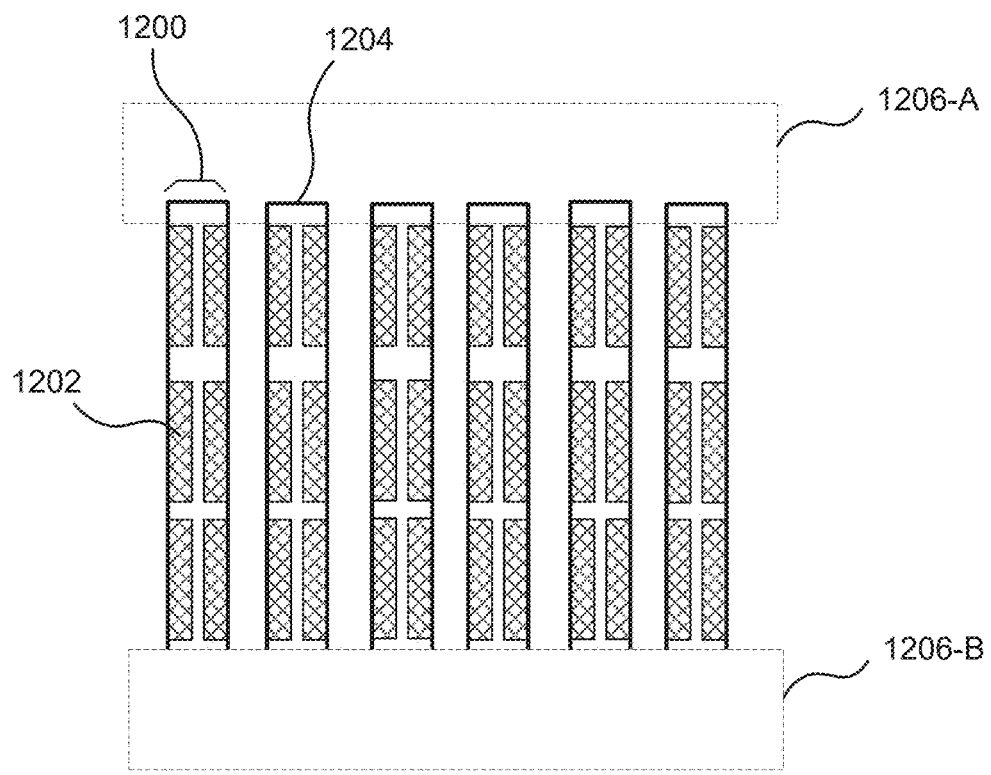
FIG. 12A is a symbolic illustration of vertically arranged conductive elements configurable as a plurality of electrodes for touch sensing and configurable into non-overlapping inductive loops for inductive stylus sensing according to some examples of the disclosure.

FIG. 12A is a symbolic illustration of vertically arranged conductive elements 1202 configurable as a plurality of electrodes 1200 for touch sensing and configurable into non-overlapping inductive loops for inductive stylus sensing according to some examples of the disclosure. In the example of FIG. 12A, each electrode 1200 can formed from two columns, each column including multiple vertically arranged conductive elements 1202 (illustrated symbolically in FIG. 12A as rectangular shapes) disposed on a substrate. In some examples, each column of vertically arranged conductive elements within electrode 1200 can be electrically connected together with connection 1204. In some examples, the two columns of conductive elements within electrode 1200 can be permanently connected together using a conductive trace or wire as connection 1204. In other examples, the two columns of conductive elements within electrode 1200 can be selectively connected together in block 1206-A of a controller integrated circuit or chip (that may be generally referred to herein as controller 1206), which can include switches/multiplexers and other circuits to selectively form connection 1204. Note that the terms "column," "row," "vertical," "horizontal" and the like, as used herein, are merely for ease of describing a particular orientation as shown in the drawings, but do not represent absolute orientations that are independent of the drawings. In other words, the terms "column" and "row" can be used interchangeably, and the terms "vertical" and "horizontal" can be used interchangeably with each other and with "column" and "row.".

Connection 1204 can configure electrode 1200 as a loop for inductive stylus sensing, as a single electrode for single-ended capacitive touch sensing, or as a differential element for differential capacitive touch sensing. In one example, electrode 1200 can be configured as a loop for inductive stylus sensing, and an analog front end (AFE) located in controller block 1206-B can receive two "legs" of the loop (e.g., the two columns of vertically arranged conductive elements 1202 within the electrode) as inputs, and sense changes in current in the loop due the presence of an EM field generated in a proximate stylus. Although the two legs of the loop are not differential inputs in the conventional sense, because the loop spacing is relatively narrow, any noise coupled onto the two legs and into the AFE will be common mode and will be cancelled by the AFE. Thus, in a sense, the electrode loop can provide differential inductive stylus sensing. The example of FIG. 12A can make multiplexing and routing simpler, and can provide for the possibility of concurrent touch and inductive stylus sensing.

Figure 12B:
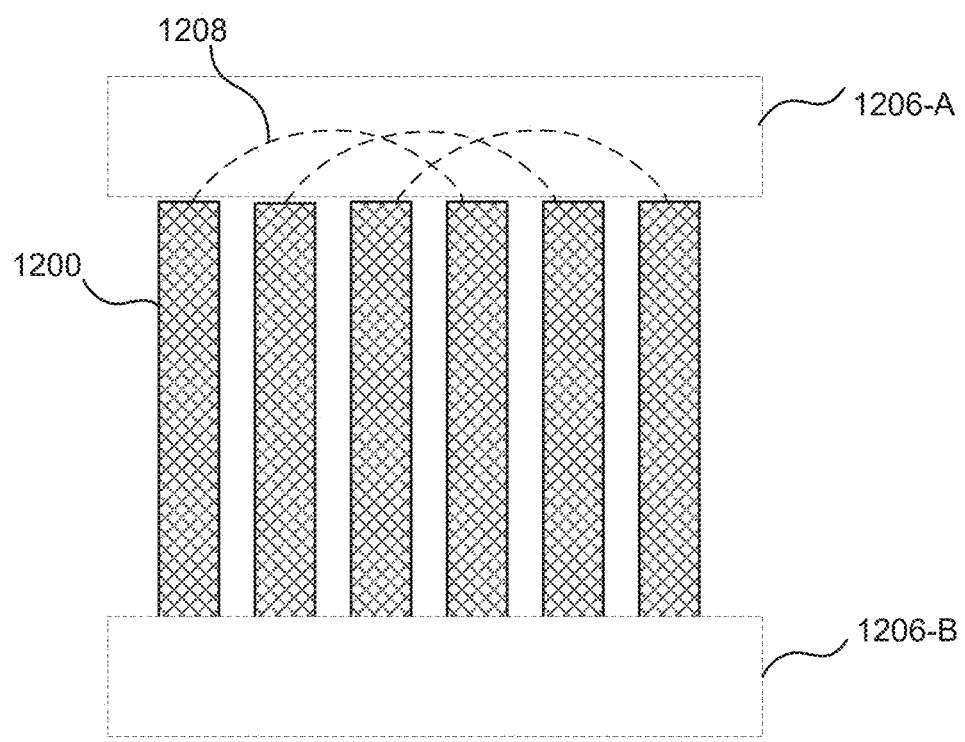
FIG. 12B is a symbolic illustration of electrodes formed as conductive bars for touch sensing and configurable into overlapping inductive loops for inductive stylus sensing according to some examples of the disclosure.

FIG. 12B is a symbolic illustration of electrodes 1200 formed as conductive bars for touch sensing and configurable into overlapping inductive loops for inductive stylus sensing according to some examples of the disclosure. In the example of FIG. 12B, each electrode 1200 can formed from a single vertically arranged conductive element (illustrated symbolically in FIG. 12B as a rectangular shape or "bar"). In some examples, each electrode 1200 can be electrically connected together with another electrode via connection 1208. In some examples, electrodes 1200 can be selectively connected together within controller block 1206-A, which may include switches/multiplexers to selectively form connections 1208. Connections 1208 can configure electrodes 1200 into multiple loops for inductive stylus sensing, and can be disconnected to separate the electrodes for individual capacitive touch sensing, the measurements being performed in controller block 1206-B. The example of FIG. 12B can provide for lower loop resistance and a larger loop area, and is more easily adaptable to existing touch sensor panel designs.

Figure 13A:
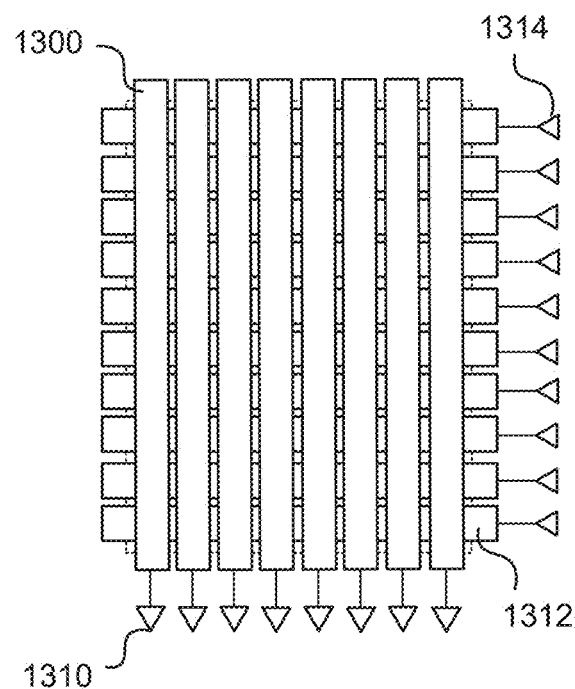
FIG. 13A is a symbolic illustration of the conductive bar electrodes of FIG. 12B arranged into a row-column capacitive sensor array according to some examples of the disclosure.

FIG. 13A is a symbolic illustration of the conductive bar electrodes of FIG. 12B arranged into a row-column capacitive sensor array according to some examples of the disclosure. In the example of FIG. 13A, in a capacitive sensing configuration, each of a plurality of horizontally arranged conductive elements or conductive bars 1312 can be driven with a stimulation signal by driver 1314, and each of a plurality of vertical conductive elements or conductive bars 1300 can be coupled to AFE 1310 for performing touch sensing. FIG. 13A illustrates a single-tapped row-column sensor array embodiment in which the drive lines (horizontally arranged conductive bars 1312) are driven from only one end, and the sense lines (conductive bars 1300) are sensed from only one end. In order to adapt the embodiment of FIG. 13A for inductive stylus sensing according to examples of the disclosure, the row and columns need to be double-tapped (connected to a controller chip at each end) to be able to change loop configurations on the fly (using switches and multiplexers within the controller).

Figure 13B:
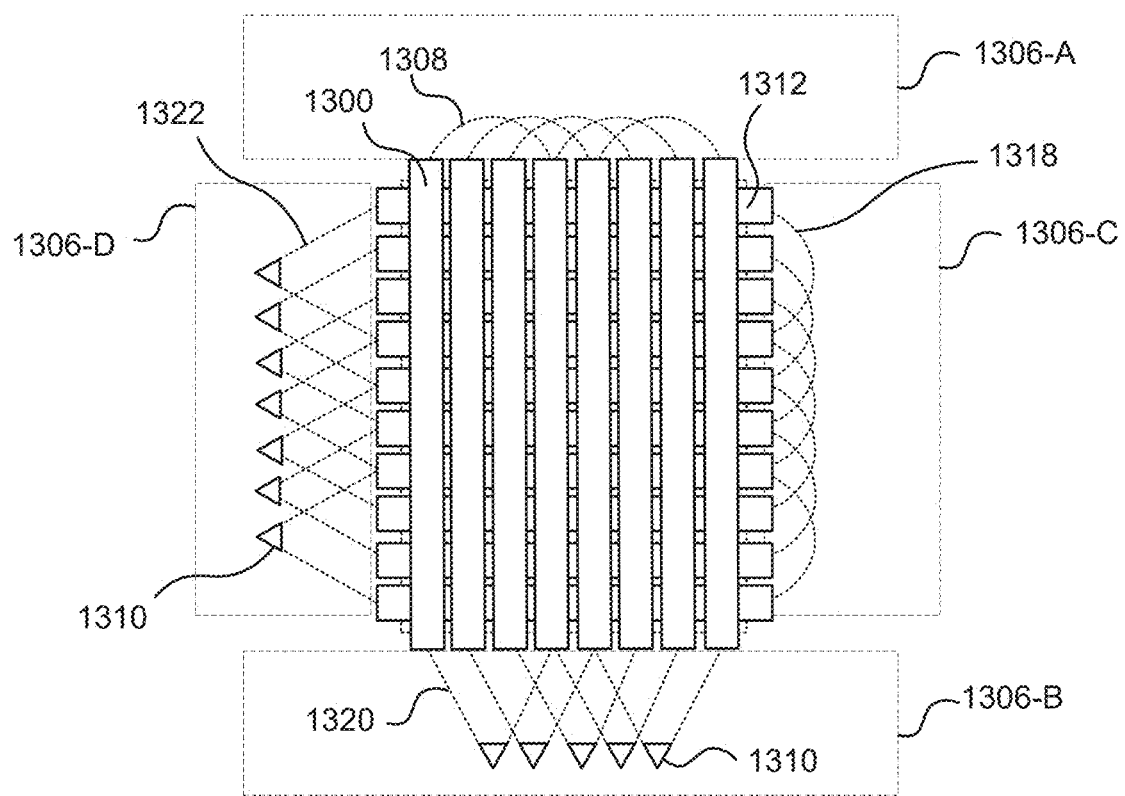
FIG. 13B is a symbolic illustration of the conductive bar electrodes of FIG. 12B arranged into a row-column capacitive sensor array that can be selectively configured for both touch sensing and overlapping loop inductive stylus sensing according to some examples of the disclosure.

FIG. 13B is a symbolic illustration of the conductive bar electrodes of FIG. 12B arranged into a row-column capacitive sensor array that can be selectively configured for both touch sensing and overlapping loop inductive stylus sensing according to some examples of the disclosure. The example of FIG. 13B illustrates a double-tapped configuration where vertical conductive bars 1300 are coupled at both ends to a controller (represented as four separate controller blocks 1306-A, 1306-B, 1306-C and 1306-D), and horizontally arranged conductive bars 1312 are also coupled at both ends to the controller.

Within the controller, controller block 1306-A can include one or more switches, multiplexers or other circuits to be able to selectively electrically connect the upper ends of pairs of vertical conductive bars 1300 together (see connections 1308), or leave those ends open (as shown in FIG. 13A). Controller block 1306-C can include one or more switches, multiplexers or other circuits to be able to selectively electrically connect the right ends of pairs of horizontally arranged conductive bars 1312 together (see connections 1318), or connect those ends to drivers (see drivers 1314 in FIG. 13A). Controller block 1306-B can include one or more switches, multiplexers or other circuits to be able to selectively electrically connect the bottom ends of pairs of vertical conductive bars 1300 to AFE 1310 (see connections 1320), or connect those ends to a single AFE (see configuration of FIG. 13A). Controller block 1306-D can include one or more switches, multiplexers or other circuits to be able to selectively electrically connect the left ends of pairs of horizontally arranged conductive bars 1312 to AFE 1310 (see connections 1322), or leave those ends open (as shown in FIG. 13A). In some examples, pairs of connections 1308 (e.g., one connection to each of two vertical conductive bars 1300 in the loop), pairs of connections 1318, pairs of connections 1320 or pairs of connections 1322 within controller 1306 can be tightly controlled and routed in a balanced manner as differential pairs to reduce the effects of stray inductive coupling.

Referring to the uppermost AFE 1310 in controller block 1306-D as being representative of an inductive measurement, when current is measured in the loop formed by connections 1322, horizontally arranged conductive bars 1312 and connections 1318, the measurement can be viewed as being differential because current is flowing away from the AFE in one direction, and flowing into the AFE in the opposite direction. AFE 1310 measures that differential current or voltage across the input terminals to the AFE, which is representative of the inductive signal to be measured. In contrast, any capacitively coupled noise will couple onto the loop as common mode noise, and will be rejected by the AFE.

Figure 14:
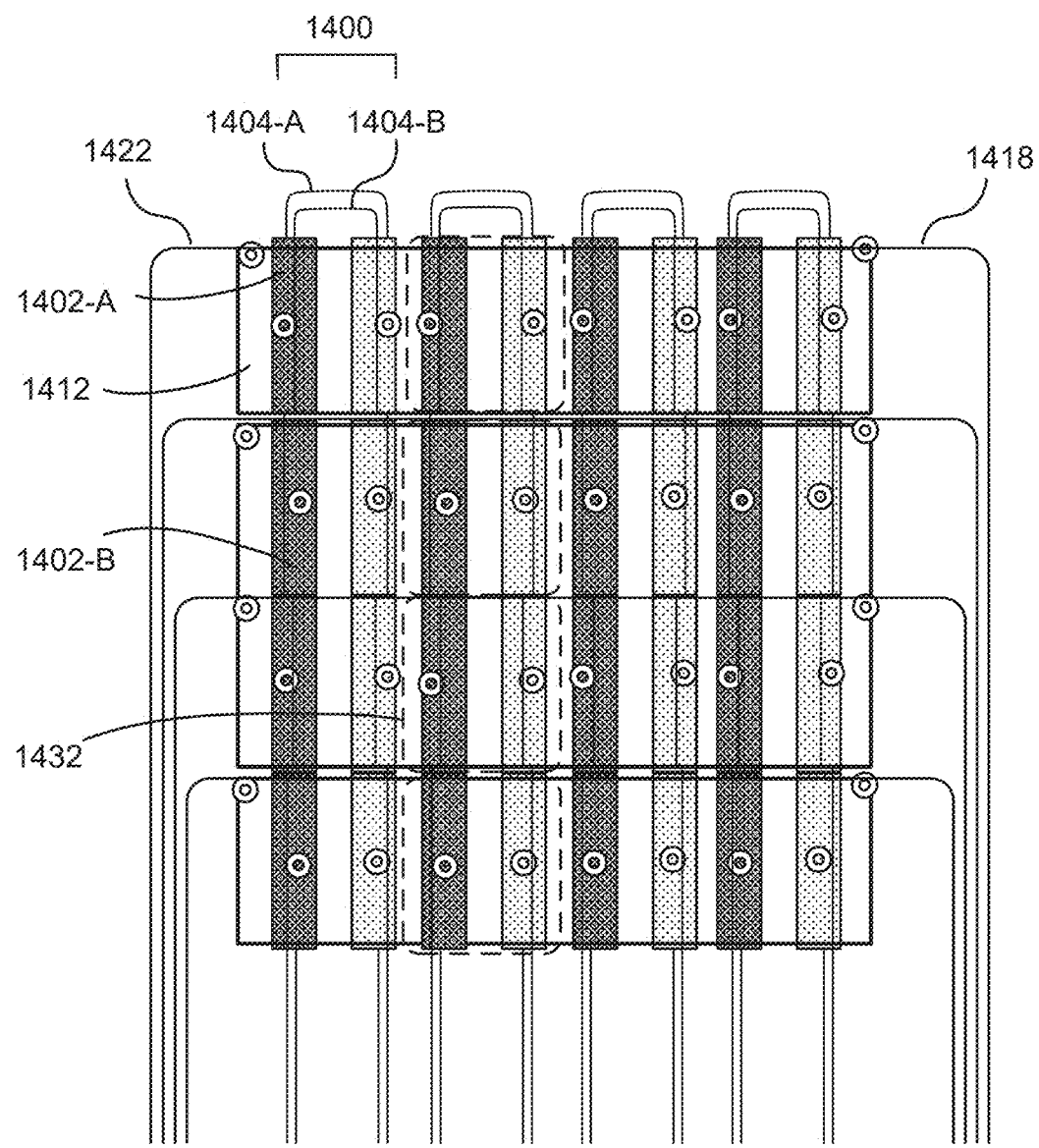
FIG. 14 is an expanded symbolic representation of FIG. 12A showing vertically arranged electrodes and also horizontally arranged conductive bars, both configurable for touch sensing and configurable into non-overlapping inductive loops for inductive stylus sensing according to some examples of the disclosure.

FIG. 14 is an expanded symbolic representation of FIG. 12A showing vertically arranged electrodes 1400 and also horizontally arranged electrodes 1412, both configurable for touch sensing and configurable into non-overlapping inductive loops for inductive stylus sensing according to some examples of the disclosure. In the example of FIG. 14, each electrode 1400 is formed from two columns of conductive elements, and each column includes two alternating but separately electrically connected pluralities of vertically arranged conductive elements 1402-A and 1402-B. Each plurality of vertically arranged conductive elements 1402-A within both columns of conductive bar 1400 can be electrically connected together with connection 1404-A. Similarly, each plurality of vertically arranged conductive elements 1402-B within both columns of conductive bar 1400 can be electrically connected together with connection 1404-B. In some examples, the two pluralities of vertically arranged conductive elements 1402-A and 1402-B within both columns of conductive bar 1400 can be permanently connected together using a conductive trace or wire as connections 1404-A and 1404-B, respectively. In other examples, the two pluralities of vertically arranged conductive elements 1402-A and 1402-B within both columns of conductive bar 1400 can be selectively connected together within a controller chip, which may include switches/multiplexers to selectively form connections 1404-A and 1404-B. Connections 1404-A and 1404-B, along with other connections (not shown) at the bottom of electrode 1400, can configure conductive bar 1400 into one or two loops for one or two-turn (e.g., one or two loop) inductive stylus sensing (described below), as a single electrode for single-ended drive or sense lines for capacitive touch sensing, or as a differential element for differential drive or sense lines for capacitive touch sensing.

Although not shown in FIG. 14, the plurality of horizontally arranged electrodes 1412 and their double-tapped connections 1422 and 1418 can be connected to the controller chip in a manner similar to that shown in FIGS. 13A and 13B, where one or more switches, multiplexers or other circuits can selectively electrically connect the right ends of pairs of horizontally arranged electrodes 1412 together (see connections 1318 in FIG. 13B) for inductive sensing, or connect those ends to drivers (see drivers 1314 in FIG. 13A) for capacitive touch sensing. Similarly, one or more switches, multiplexers or other circuits can selectively electrically connect the left ends of pairs of horizontally arranged electrodes 1412 to an AFE (see AFE 1310 in FIG. 13B) for inductive sensing, or leave those ends open (see configuration of FIG. 13A) for capacitive touch sensing.

The combination of vertically arranged electrodes 1400 and horizontally arranged electrodes 1412 results in a plurality of sense pixels 1432 that can be connected and configured to switch between touch sensing and inductive sensing. In one representative example, touch sensing can be accomplished by the single-ended drive row stimulation of one horizontally arranged electrode 1412, and the differential sense column sensing of the two pluralities of vertically arranged conductive elements 1402-A and 1402-B within both columns of vertically arranged electrodes 1400. One advantage of utilizing a single-ended drive configuration for capacitive touch sensing is that the plurality of horizontally arranged conductive bars 1412 and the two pluralities of vertically arranged conductive elements 1402-A and 1402-B can be formed on a single layer, advantageously resulting in a simpler layout and lower row parasitic noise coupling. Inductive sensing can be accomplished in the horizontal direction using loops formed from pairs of horizontally arranged electrodes 1412, and in the vertical direction using loops formed from vertically arranged conductive elements 1402-A and 1402-B within vertically arranged electrodes 1400.

Figure 15A:
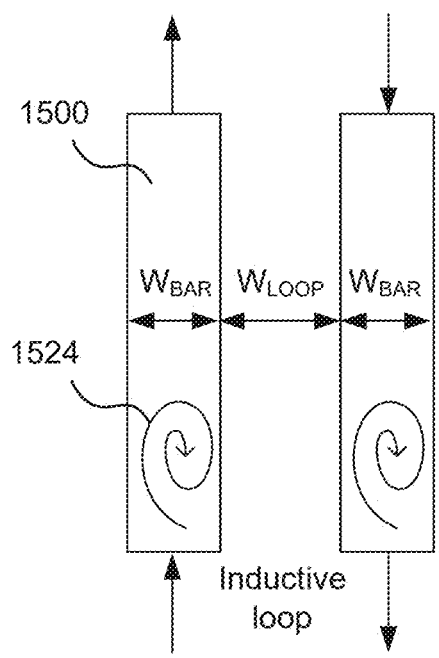
FIG. 15A illustrates some parameters of two vertically arranged conductive bars that demonstrate some design tradeoffs between capacitive touch sensing and inductive stylus sensing according to some examples of the disclosure.

FIG. 15A illustrates some parameters of two vertically arranged electrodes formed as conductive bars 1500 that demonstrate some design tradeoffs between capacitive touch sensing and inductive stylus sensing according to some examples of the disclosure. In the example of FIG. 15A, two vertical conductive bars 1500 are shown, each having a width $W_{BAR}$ and a spacing between them of $W_{LOOP}$. A coplanar capacitive touch sensor should ideally have the largest sensing surface area possible from a signal-to-noise ratio (SNR) perspective to maximize the capacitive signal. Accordingly, for maximized capacitive touch sensing, $W_{BAR}$ should be maximized in FIG. 15A. In contrast, an ideal inductive sensing element is a wire with a zero cross-sectional area. If the inductive sensing element is a conductive bar 1500, such as that shown in FIG. 15A, it has a finite cross-sectional area and it will produce undesirable eddy current loops 1524 within the conductive bar. These eddy currents can create magnetic fields that oppose the magnetic field generated by the stylus, diminishing the inductive sense signal. Accordingly, for maximized inductive stylus sensing, $W_{BAR}$ should be minimized in FIG. 15A.

In addition, for maximized inductive stylus sensing, the area within the loop should be maximized, so $W_{LOOP}$ should be a large as possible. Within the finite width of a single electrode, increasing $W_{LOOP}$ requires that $W_{BAR}$ be decreased. However, as noted above, for maximized capacitive touch sensing, $W_{BAR}$ should be maximized.

Figure 15B:
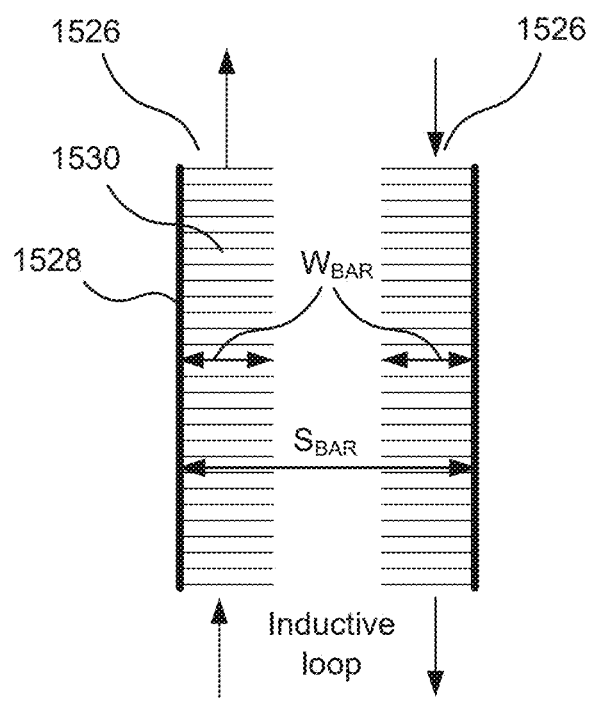
FIG. 15B illustrates two vertically arranged electrodes that mitigate some of the challenges of the conductive bars of FIG. 15A with respect to capacitive touch sensing and inductive stylus sensing according to some examples of the disclosure.

FIG. 15B illustrates two vertically arranged electrodes 1526 that mitigate some of the challenges of the conductive bars of FIG. 15A with respect to capacitive touch sensing and inductive stylus sensing according to some examples of the disclosure. In the example of FIG. 15B, vertically arranged electrodes 1526 are comb-shaped, each including a continuous comb shaft 1528 and comb teeth 1530 extending from the comb shaft (e.g., perpendicular to the comb shaft), the comb teeth not contributing to the current flow through the comb shaft. The outermost comb shafts 1528 in FIG. 15 are used for current conduction, whereas comb teeth 1530 provide the area for capacitive touch sensing. Comb teeth 1530 do not support current conduction and therefore do not have eddy currents and do not take away from the loop area, both of which improve inductive sensing. In essence, comb teeth 1530 effectively provide a larger area for beneficial capacitive touch sensing, while limiting eddy currents and maximizing loop area for beneficial inductive sensing. One drawback to FIG. 15B is that because a significant portion of the conductive current-carrying material is being removed, the RC bandwidth decreases.

The examples of FIGS. 12A, 14 and 15B discussed above were symbolic representations of electrode configurations for touch sensing and inductive sensing. The following figures and disclosure illustrate and describe various sense pixels and their tiling arrangements that can be used to form different electrode configurations.

Figure 16A:
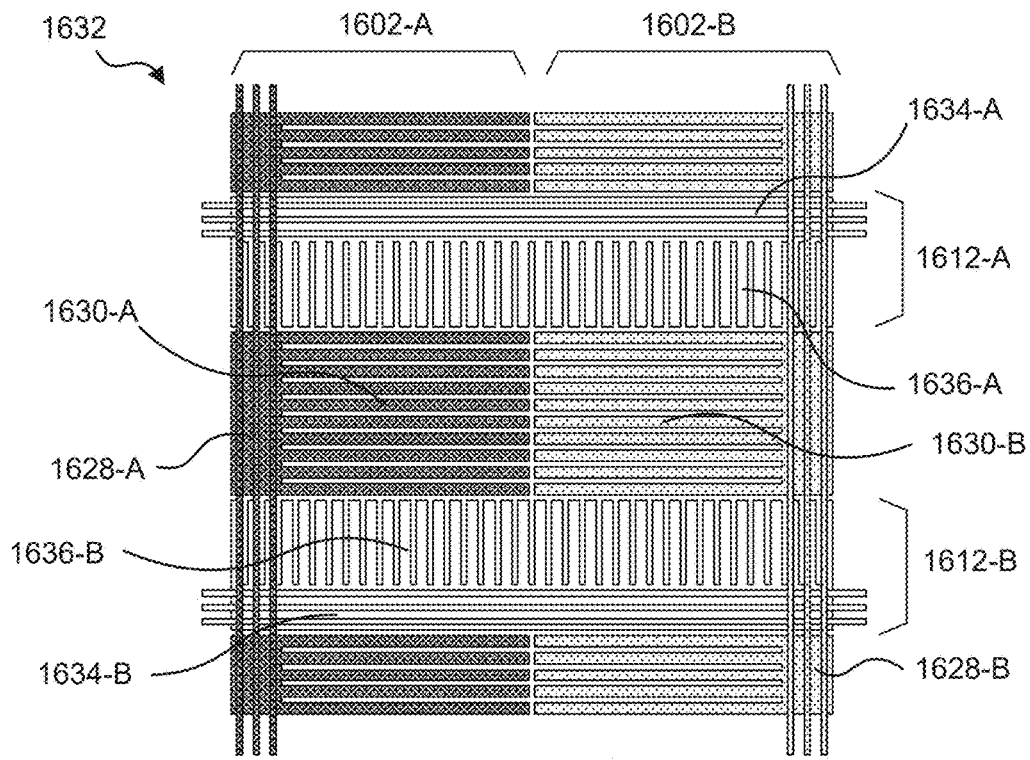
FIG. 16A illustrates a sense pixel that can be replicated, tiled and configured for capacitive touch sensing and inductive stylus sensing according to some examples of the disclosure.

FIG. 16A illustrates a sense pixel 1632 that can be replicated, tiled and configured for capacitive touch sensing and inductive stylus sensing according to some examples of the disclosure. Sense pixel 1632 in FIG. 16A is similar in some respects to sense pixel 1432 in FIG. 14, with a comb structure similar to that shown in FIG. 15B. It should be noted that sense pixel 1632, and other sense pixels described herein, are generally referred to as "sense" pixels due to their use within touch sensing configurations and inductive sensing configurations. However, sense pixels are not strictly limited to "sensing" configurations, but rather can also be used to form touch transmit (drive) electrodes and loops that generate EM fields for detection by a separate stylus, both of which contribute to touch sensing or inductive sensing. In the example of FIG. 16A, sense pixel 1632 includes two vertically arranged conductive elements 1602-A and 1602-B. Vertically arranged conductive element 1602-A is formed from comb shaft 1628-A and comb teeth 1630-A extending from the comb shaft. Vertically arranged conductive element 1602-B is formed from comb shaft 1628-B and comb teeth 1630-B extending from the comb shaft. Sense pixel 1632 also includes two horizontally arranged conductive elements 1612-A and 1612-B. Horizontally arranged conductive element 1612-A is formed from comb shaft 1634-A and comb teeth 1636-A. Horizontally arranged conductive element 1612-B is formed from comb shaft 1634-B and comb teeth 1636-B. In some examples, conductive elements 1602-A, 1602-B, 1612-A and 1612-B can be formed on the same layer, in which case vias may be utilized to connect to jumpers on another layer to enable the vertically arranged and horizontally arranged conductive elements to cross over each other without electrically connecting to each other. In other examples, the vertically arranged conductive elements and the horizontally arranged conductive elements can be formed on different layers, eliminating the need for crossover elements such as vias and jumpers.

When configured for touch sensing, horizontally arranged conductive elements 1612-A and 1612-B can be driven with separate drive (stimulation) signals, where current primarily flows in comb shafts 1634-A and 1634-B and not in comb teeth 1636-A and 1636-B. Vertically arranged conductive elements 1602-A and 1602-B can be sensed independently or differentially for capacitive touch sensing. When configured for inductive sensing, vertically arranged conductive elements 1602-A and 1602-B can be connected in a loop by an electrical connection formed in a controller chip. In one example where an AFE measurement circuit is connected to the vertical conductive elements at the bottom of FIG. 16A and the loop-forming electrical connection is made at the top, current can flow up comb shaft 1628-A of vertically arranged conductive element 1602-A and down comb shaft 1628-B of vertically arranged conductive element 1602-B. A similar arrangement can also be applied to horizontally arranged conductive elements 1612-A and 1612-B, where they can be connected in a loop by an electrical connection formed in a controller chip.

Figure 16B:
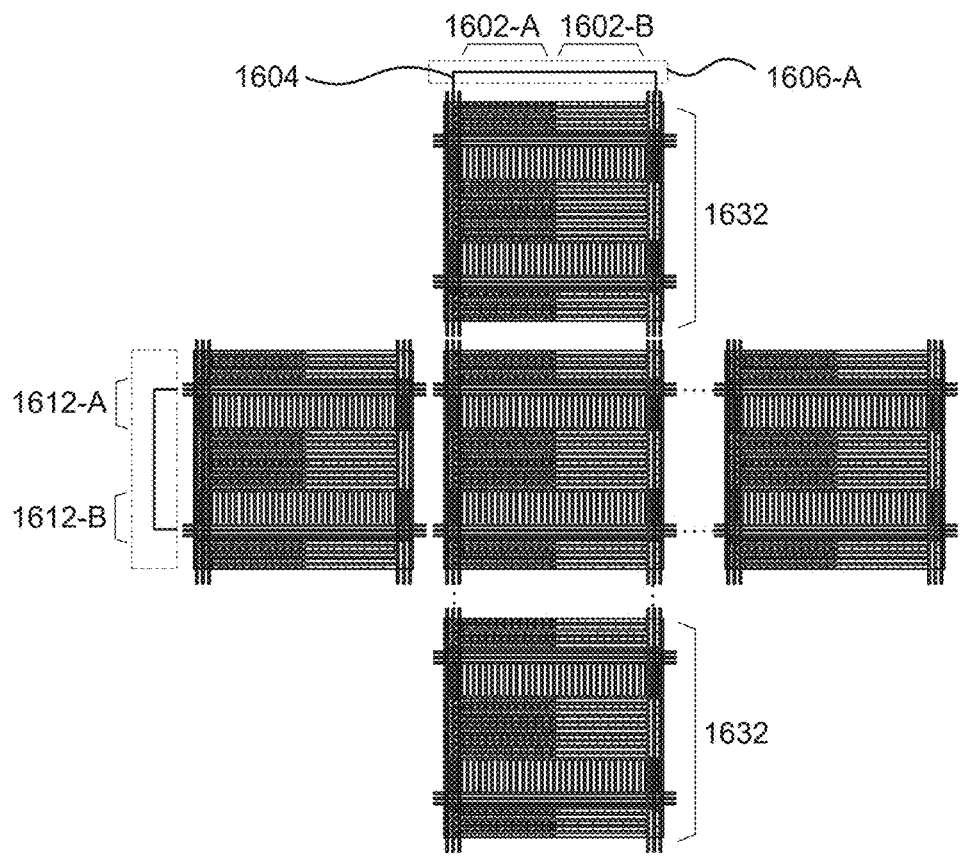
FIG. 16B illustrates a plurality of sense pixels tiled to form a column electrode and a row electrode according to some examples of the disclosure.

FIG. 16B illustrates a plurality of sense pixels 1632 tiled to form a column electrode and a row electrode according to some examples of the disclosure. In the example of FIG. 16B, a column electrode can be formed from a plurality of vertically arranged sense pixels 1632, wherein the comb shafts 1628-A and 1628-B (see FIG. 16A) of the vertically arranged conductive elements 1602-A and 1602-B of the vertically arranged sense pixels can be connected together to form two vertically arranged conductive pathways within the column electrode. Although only three vertically arranged sense pixels are illustrated in FIG. 16B for purposes of simplifying the figure, it should be understood that any number of sense pixels may be tiled to form the column electrode.

Similarly, a row electrode can be formed from a plurality of horizontally arranged sense pixels 1632, wherein the comb shafts 1634-A and 1634-B (see FIG. 16A) of the horizontally arranged conductive elements 1612-A and 1612-B of the horizontally arranged sense pixels can be connected together to form two horizontally arranged conductive pathways within the row electrode. Although only three horizontally arranged sense pixels are illustrated in FIG. 16B for purposes of simplifying the figure, it should be understood that any number of sense pixels may be tiled to form the row electrode.

Figure 16C:
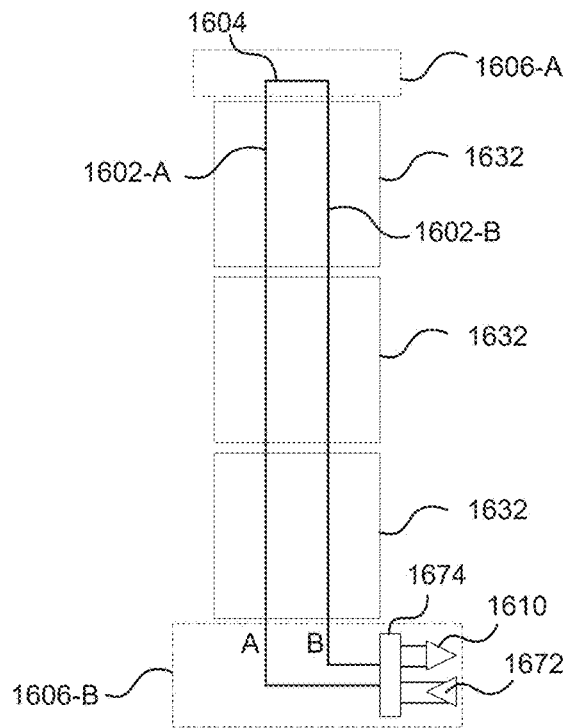
FIG. 16C is a symbolic illustration of two columns of conductive elements routed through a single column electrode of tiled sense pixels and configurable for performing single-ended or differential capacitive touch sensing, or single loop inductive stylus sensing, according to some examples of the disclosure.

FIG. 16C is a symbolic illustration of two columns of conductive elements routed through a single column electrode of tiled sense pixels and configurable for performing single-ended or differential capacitive touch sensing, or single loop inductive stylus sensing, according to some examples of the disclosure. FIG. 16C can be viewed as one example of a general configuration of a column electrode that can form the basis for several specific configurations to follow. In the example of FIG. 16C, vertical conductive elements 1602-A and 1602-B, formed from the connected comb shafts of the tiled sense pixels 1632 of a single column electrode, are shown as simple lines or conductive pathways for purposes of simplifying the figure. Connection 1604 in controller block 1606-A electrically connects vertically arranged conductive elements 1602-A and 1602-B together. The two columns of vertically arranged conductive elements 1602-A and 1602-B (labeled near the bottom of FIG. 16C as simply A and B for purposes of simplifying the figure) can be selectively configured and connected within controller block 1606-B to perform either single-ended or differential capacitive touch sensing, or one turn (single loop) inductive stylus sensing. Amplifier 1672 and AFE 1610 are shown in controller block 1606-B as representative of electronics that can be formed within the controller, or alternatively in discrete circuits or separate integrated circuits outside the controller, and block 1674 is shown to represent various switches, multiplexers and other configurable elements to form various connections as directed by the controller.

Figures 1, 16D:
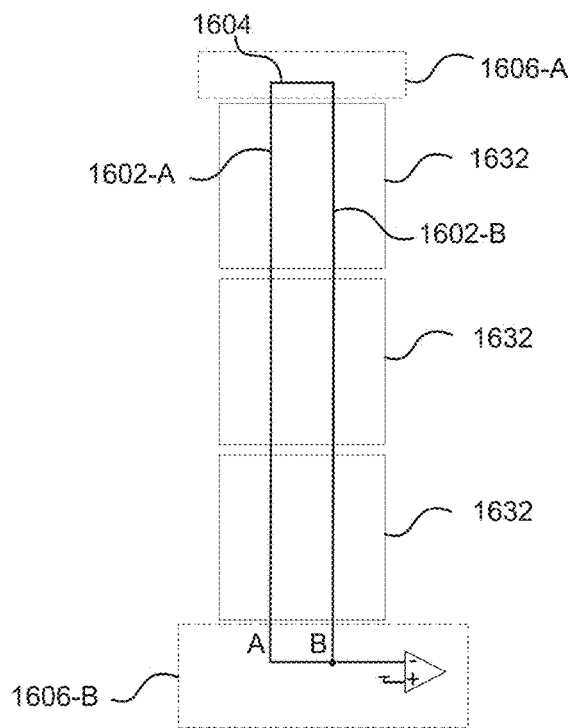
FIG. 16D-1 is a symbolic illustration of two columns of conductive elements routed through a single column electrode of tiled sense pixels and configured as a single-ended capacitive touch receive (sense) electrode according to some examples of the disclosure.
Figures 2, 16D:
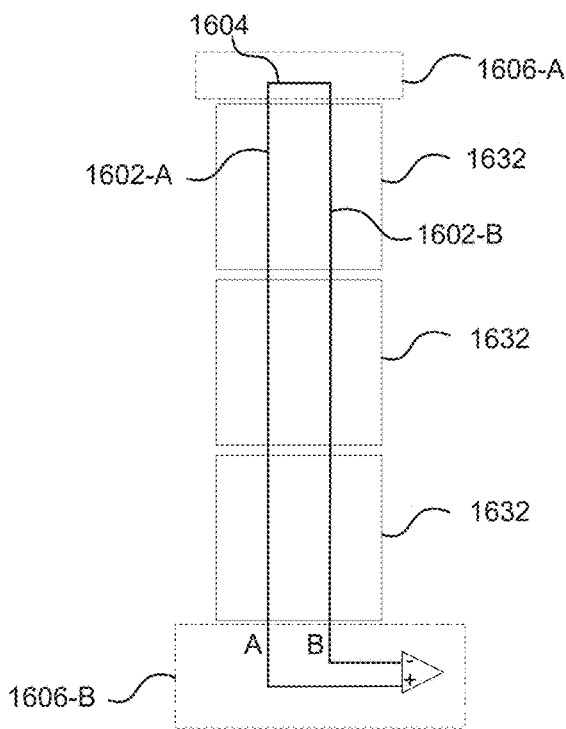

FIG. 16D-1 is a symbolic illustration of two columns of conductive elements routed through a single column electrode of tiled sense pixels and configured as a single-ended capacitive touch receive (sense) electrode according to some examples of the disclosure. In the example of FIGS. 16D-1, A and B are shorted together and connected to the inverting input of a virtual ground amplifier, with the noninverting input of the amplifier held at a reference voltage for single-ended capacitive touch sensing.

FIG. 16D-2 is a symbolic illustration of two columns of conductive elements routed through a single column electrode of tiled sense pixels and configured as a single-loop inductive sensor according to some examples of the disclosure. In the example of FIGS. 16D-1, A and B are separately connected to the two inputs of a differential amplifier.

Figures 3, 16D:
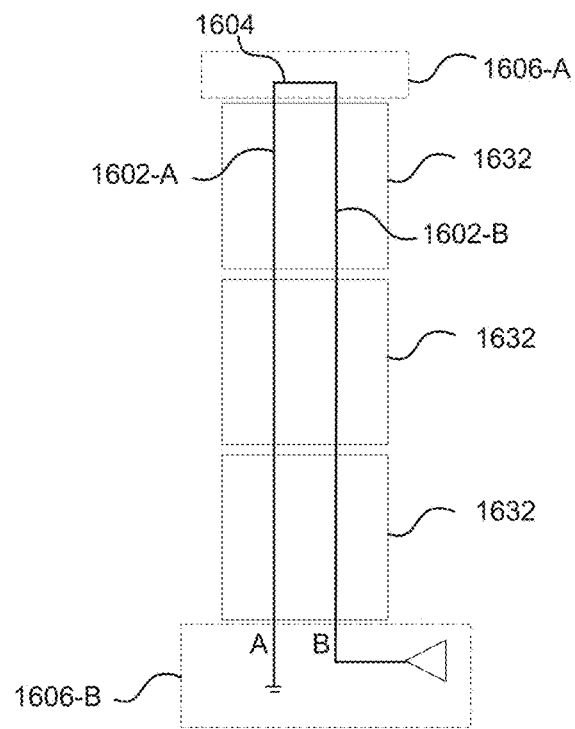
Figures 4, 16D:
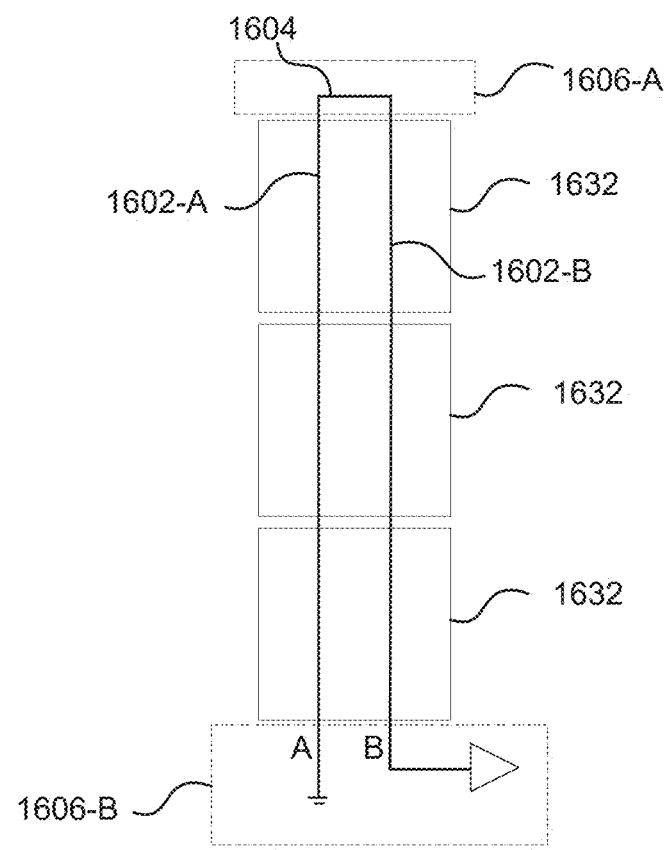

FIG. 16D-3 is a symbolic illustration of two columns of conductive elements routed through a single column electrode of tiled sense pixels and configured for performing single loop inductive stylus sensing with an active receive stylus according to some examples of the disclosure. In the example of FIG. 16D-3, which corresponds to the inductive sensing arrangement of FIG. 8, B can be connected to the output of a current driver, and A can be connected to ground.

FIG. 16D-4 is a symbolic illustration of two columns of conductive elements routed through a single column electrode of tiled sense pixels and configured for performing single loop inductive stylus sensing with an active transmit stylus according to some examples of the disclosure. In the example of FIG. 16D-4, which corresponds to the inductive sensing arrangement of FIG. 9, B can be connected to an input of a voltage detect amplifier, and B can be connected to ground.

It should be understood that although FIG. 16C and FIGS. 16D-1 through 16D-4 show only column electrode configurations, in other examples the row electrodes can be similarly configured.

Figure 17A:
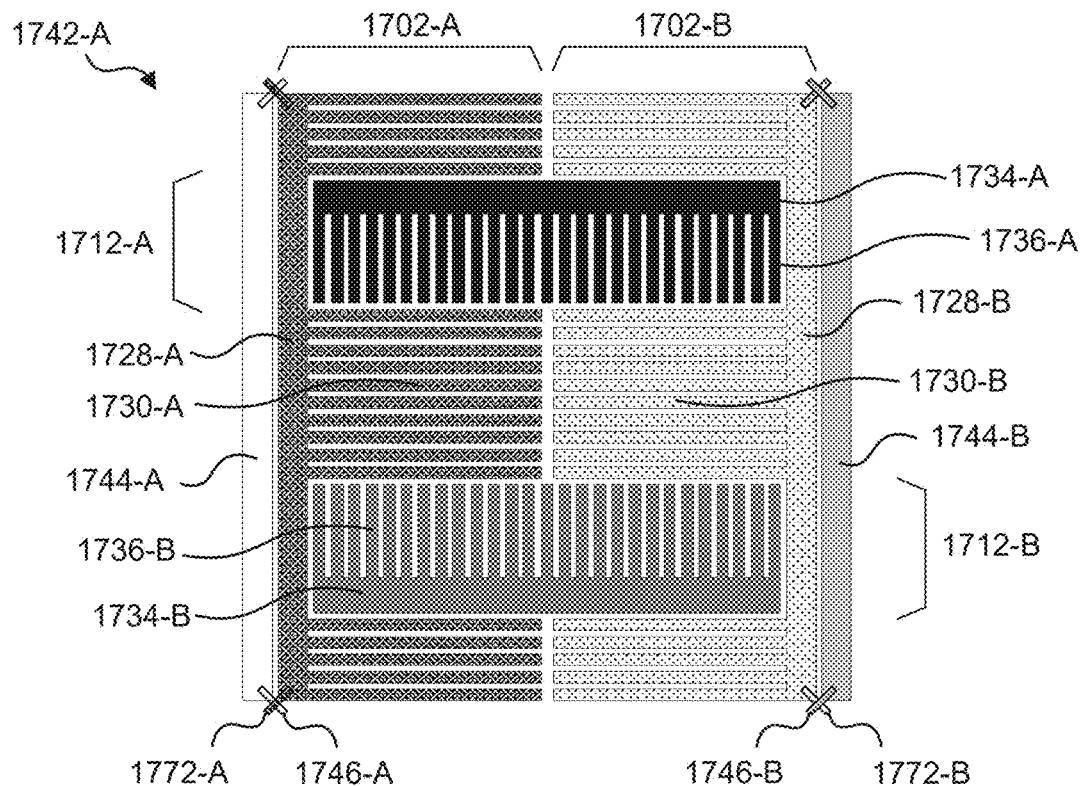
FIG. 17A illustrates a sense pixel that can be replicated, tiled and configured for capacitive touch sensing and inductive stylus sensing according to some examples of the disclosure.

FIG. 17A illustrates a sense pixel 1742-A that can be replicated, tiled and configured for capacitive touch sensing and inductive stylus sensing according to some examples of the disclosure. Sense pixel 1742-A in FIG. 17A is similar in some respects to sense pixel 1432 in FIG. 14, with a comb structure similar to that shown in FIG. 15B. In the example of FIG. 17A, sense pixel 1742-A includes two vertically arranged conductive elements 1702-A and 1702-B. Vertically arranged conductive element 1702-A is formed from comb shaft 1728-A and comb teeth 1730-A extending from the comb shaft. Vertically arranged conductive element 1702-B is formed from comb shaft 1728-B and comb teeth 1730-B extending from the comb shaft. Vertically arranged conductive element 1702-A includes bridges 1772-A at its top and bottom outer corners for providing electrical connections to adjacent sense pixels (see FIG. 17B). Similarly, vertically arranged conductive element 1702-B includes bridges 1772-B at its top and bottom outer corners for providing electrical connections to adjacent sense pixels. Sense pixel 1742-A also includes two vertically arranged bypass conductive elements 1744-A and 1744-B. Bypass conductive element 1744-A includes bridges 1746-A at its top and bottom for providing electrical connections to adjacent sense pixels. Similarly, bypass conductive element 1744-B includes bridges 1746-B at its top and bottom for providing electrical connections to adjacent sense pixels. Sense pixel 1742-A also includes two horizontally arranged conductive elements 1712-A and 1712-B. Horizontally arranged conductive element 1712-A is formed from comb shaft 1734-A and comb teeth 1736-A. Horizontally arranged conductive element 1712-B is formed from comb shaft 1734-B and comb teeth 1736-B. In some examples, conductive elements 1702, 1712 and 1744 can be formed on the same layer, in which case vias may be utilized to connect to bridges 1772-A, 1772-B, 1746-A, or 1746-B formed on another layer to enable the two bridges to cross over each other without electrically connecting to each other. In other examples, conductive elements 1702 and 1744 can be formed on different layers, eliminating the need for vias to connect to bridges 1772-A, 1772-B, 1746-A, or 1746-B.

Figure 17B:
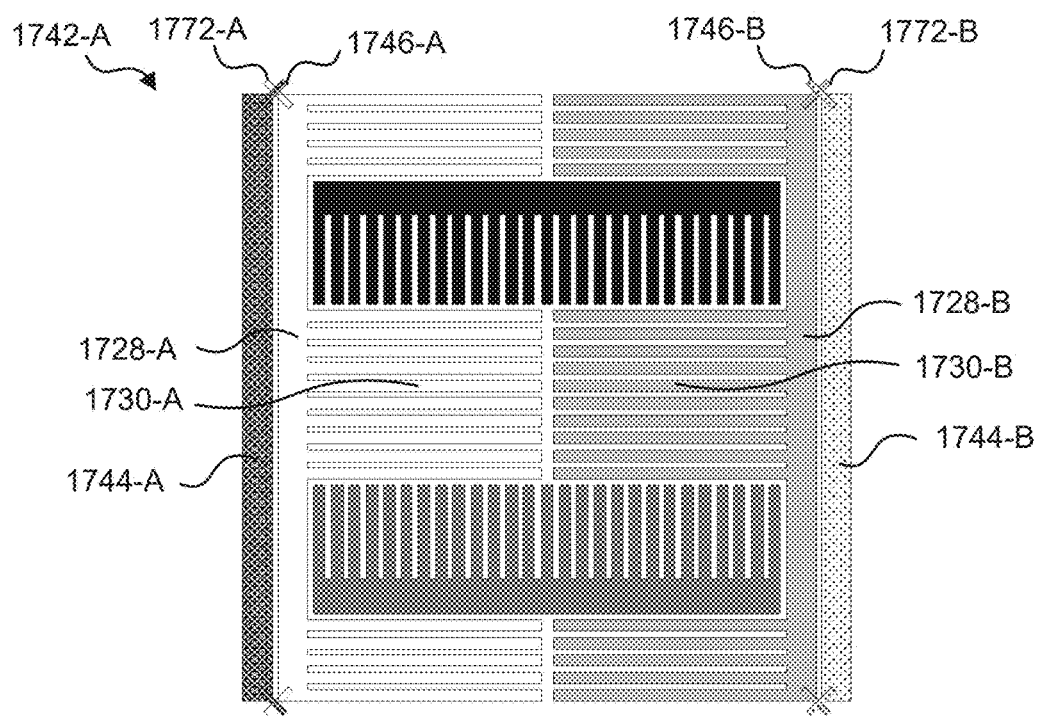
FIG. 17B illustrates another sense pixel that can be replicated, tiled and configured for capacitive touch sensing and inductive stylus sensing according to some examples of the disclosure.

FIG. 17B illustrates another sense pixel 1742-A that can be replicated, tiled and configured for capacitive touch sensing and inductive stylus sensing according to some examples of the disclosure. Sense pixel 1742-B is the same design as sense pixel 1742-A in FIG. 17A. However, FIG. 17B is shown with shading that illustrates the electrical connections between two adjacent sense pixels 1742-A through bridges 1772-A, 1746-A, 1746-B and 1772-B when the two adjacent sense pixels are connected. As the shading in FIGS. 17A and 17B indicates, conductive element 1702-A in FIG. 17A is connected to bypass conductive element 1744-A in FIG. 17B through bridge 1772-A in FIG. 17A and bridge 1746-A in FIG. 17B. Similarly, conductive element 1702-B in FIG. 17A is connected to bypass conductive element 1744-B in FIG. 17B through bridge 1772-B in FIG. 17A and bridge 1746-B in FIG. 17B. Bypass conductive element 1744-A in FIG. 17A is connected to comb shaft 1728-A and comb teeth 1730-A in FIG. 17B through bridge 1746-A in FIG. 17A and bridge 1772-A in FIG. 17B. Similarly, bypass conductive element 1744-B in FIG. 17A is connected to comb shaft 1728-B and comb teeth 1730-B in FIG. 17B through bridge 1746-B in FIG. 17A and bridge 1772-B in FIG. 17B.

Figure 17C:
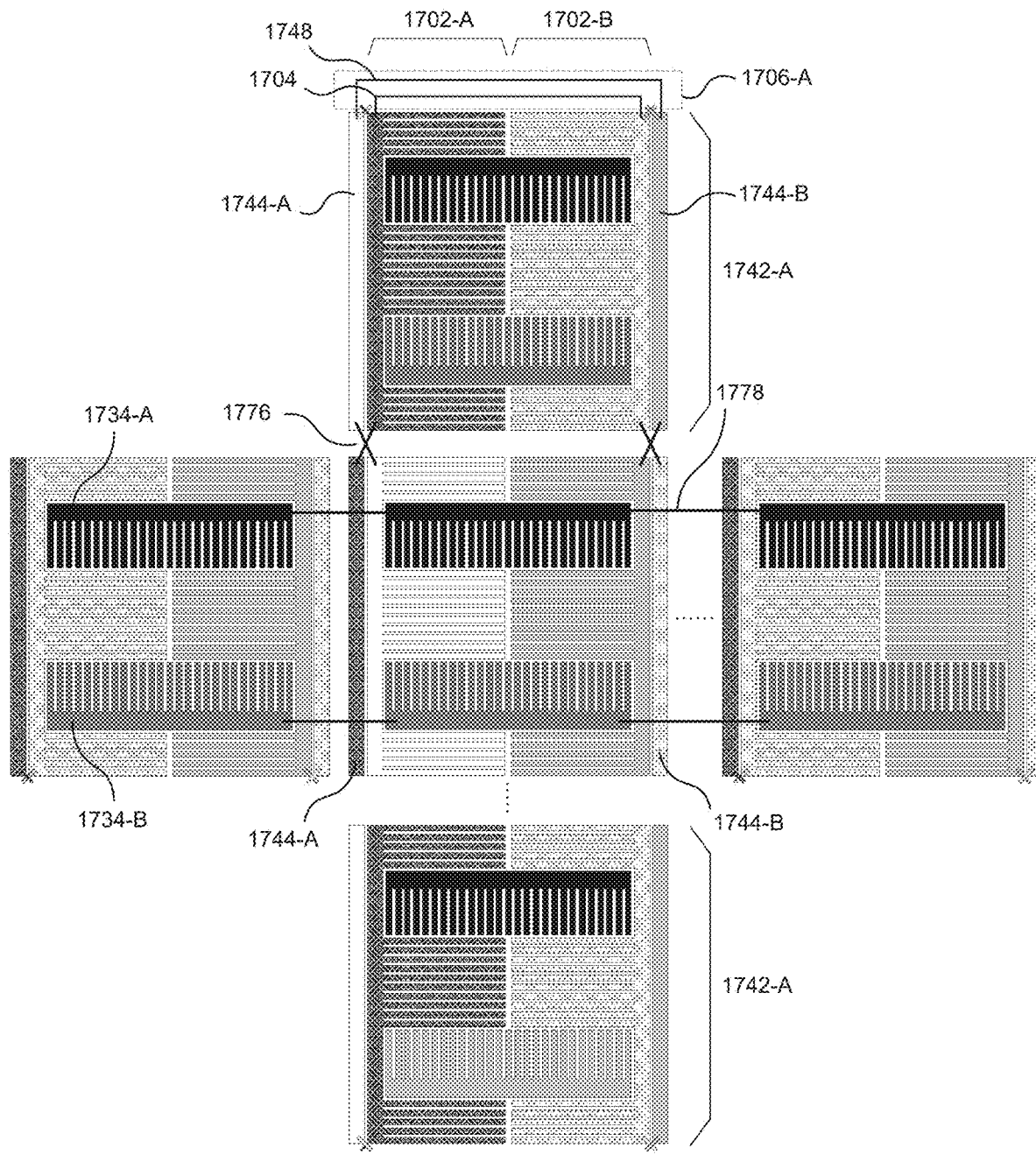
FIG. 17C illustrates a plurality of sense pixels tiled to form a column electrode for performing either single-ended or differential touch sensing or one or two turn (single or double loop) inductive stylus sensing according to some examples of the disclosure.

FIG. 17C illustrates a plurality of sense pixels 1742-A tiled to form a column electrode and a row electrode according to some examples of the disclosure. In the example of FIG. 17C, the bridges that connect two vertically adjacent sense pixels are illustrated symbolically as lines 1776. Although only three vertically arranged sense pixels are illustrated in FIG. 17C for purposes of simplifying the figure, it should be understood that any number of sense pixels may be tiled to form the column electrode. When tiled, vertically arranged conductive element 1702-A in upper sense pixel 1742-A is routed to bypass conductive element 1744-A in the middle sense pixel, effectively bypassing the middle sense pixel and forming a first vertical conductive pathway through the column electrode. Similarly, vertically arranged conductive element 1702-B in upper sense pixel 1742-A is routed to bypass conductive element 1744-B in the middle sense pixel, effectively bypassing the middle sense pixel and forming a second vertical conductive pathway through the column electrode. Bypass conductive elements 1744-A and 1744-B in upper sense pixel 1742-A are also routed to the vertically arranged conductive elements in the middle sense pixel, forming third and fourth conductive pathways through the column electrode.

FIG. 17C demonstrates that vertically arranged conductive element 1702-A, vertically arranged conductive element 1702-B, vertically arranged bypass conductive element 1744-A, and vertically arranged bypass conductive element 1744-B can each be routed through an entire column electrode formed from vertically tiled sense pixels 1742-A by alternatingly connecting conductive elements and bypass conductive elements in the vertically tiled sense pixels of the column electrode, thereby creating four vertical conductive pathways through the column electrode.

As can be seen from FIG. 17C, the four conductive pathways of vertically arranged conductive elements can be advantageously routed through a single column electrode of tiled sense pixels while requiring only the width and area of two columns of conductive elements. In addition, connection 1704 formed in controller block 1706-A can electrically connect two columns of vertically arranged conductive elements within a single column electrode of tiled sense pixels to form a first loop, and connection 1748 formed in the controller block can electrically connect the two other columns of vertically arranged conductive elements to form a second loop. The four connection points to these two loops can be selectively connected within the controller to enable differential touch sensing, one or two turn (single or double loop) inductive stylus sensing, or other configurations.

Similarly, horizontally adjacent sense pixels 1742 can be connected though the comb shafts of their horizontally arranged conductive elements 1712-A and 1712-B (see FIG. 17A) to form a row electrode. The bridges that connect two horizontally adjacent sense pixels are illustrated symbolically as lines 1778 in FIG. 17C. Note that lines 1778 represent vias and jumpers or bridges on a different layer from the conductive elements and bypasses on the sense pixels in order to make the necessary electrical connections. Although only three horizontally arranged sense pixels are illustrated in FIG. 17C for purposes of simplifying the figure, it should be understood that any number of sense pixels may be tiled to form the row electrode. When tiled, the horizontally arranged conductive elements 1712-A and 1712-B in each of the horizontally arranged sense pixels 1742 of a row electrode can be connected together using lines 1778 to create two horizontal conductive pathways through the row electrode. Each row electrode can be separately driven for capacitive touch sensing, or loops can be selectively formed by connections within the controller and measured by AFEs within the controller to perform inductive loop sensing in the horizontal direction.

Figure 17D:
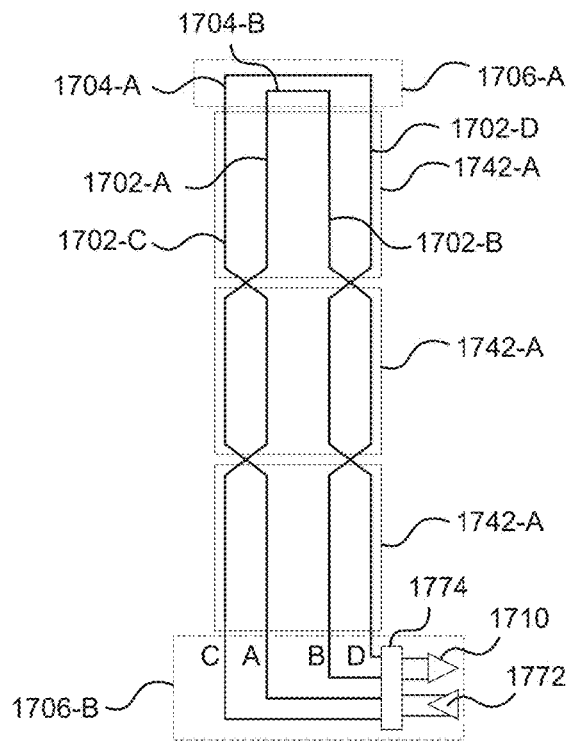
FIG. 17D is a symbolic illustration of four columns of conductive elements routed through a single column electrode of tiled sense pixels and configurable for performing single-ended or differential capacitive touch sensing, or single loop or two loop inductive stylus sensing, according to some examples of the disclosure.

FIG. 17D is a symbolic illustration of four columns of conductive elements routed through a single column electrode of tiled sense pixels and configurable for performing single-ended or differential capacitive touch sensing, or single loop or two loop inductive stylus sensing, according to some examples of the disclosure. FIG. 17D can be viewed as one example of a general configuration of a column electrode that can form the basis for several specific configurations to follow. In the example of FIG. 17D, four conductive pathways of vertical conductive elements 1702-

A, 1702-B, 1702-C and 1702-D, formed from alternating comb-bypass-comb connections through tiled sense pixels 1742-A of a single column electrode, are shown as simple lines for purposes of simplifying the figure. Connection 1704-B in controller block 1706-A electrically connects vertically arranged conductive elements 1702-A and 1702-B together, and connection 1704-A in the controller block electrically connects vertically arranged conductive elements 1702-C and 1702-D together. (Note, however, that in other examples not shown in FIG. 17D, connections 1704-A and 1704-B can be switched to electrically connect different pairs of vertically arranged conductive elements.) The four columns of vertically arranged conductive elements 1702-A, 1702-B, 1702-C and 1702-D (labeled near the bottom of FIG. 17D as simply A, B, C and D for purposes of simplifying the figure) can be selectively configured and connected within controller block 1706-B to perform either single-ended or differential capacitive touch sensing, or one or two turn (single or double loop) inductive stylus sensing. Amplifiers 1710 and 1772 are shown in controller block 1706-B as representative of electronics that can be formed within the controller, or alternatively in discrete circuits or separate integrated circuits outside the controller, and block 1774 is shown to represent various switches, multiplexers and other configurable elements to form various connections as directed by the controller.

Figures 1, 17E:
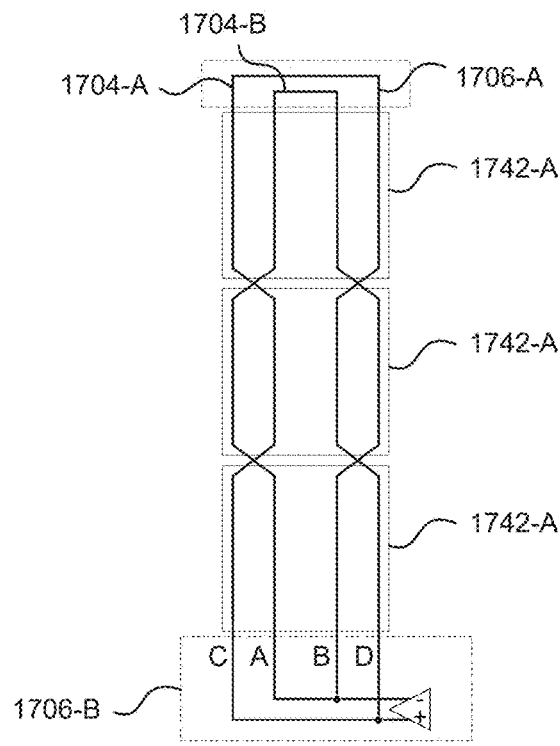
Figures 2, 17E:
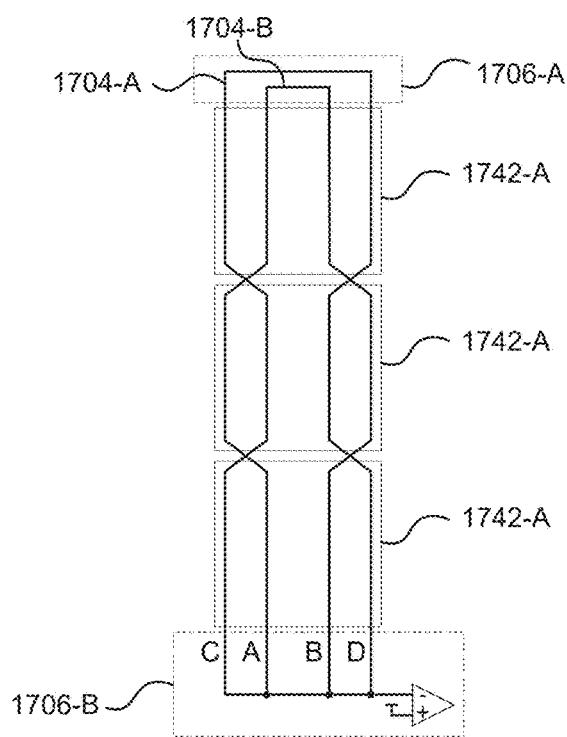
Figures 3, 17E:
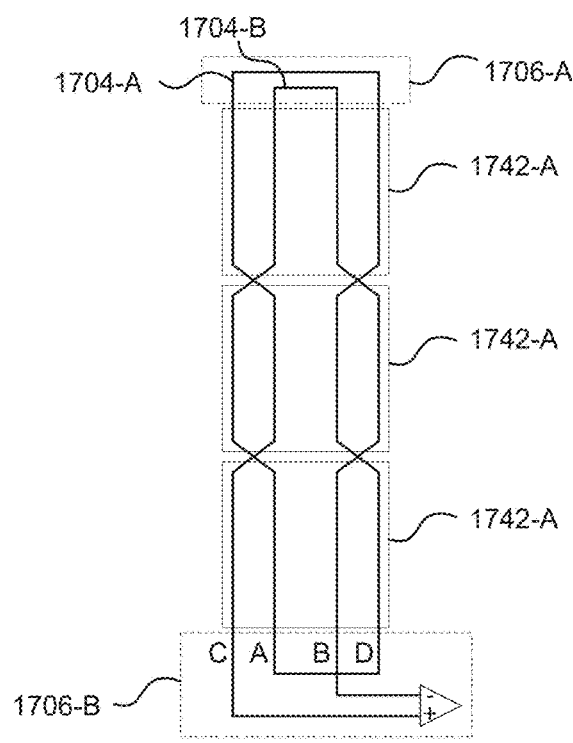

FIG. 17E-1 is a symbolic illustration of four columns of conductive elements routed through a single column electrode of tiled sense pixels and configured as a differential capacitive touch transmit (drive) electrode according to some examples of the disclosure. In the example of FIGS. 17E-1, C and D are shorted together and connected to the positive output of amplifier 1772 configured as a differential driver, while A and B are shorted together and connected to the negative output of the differential driver to generate the differential drive (stimulation) signals for differential capacitive touch sensing. (In this mode, the horizontally arranged conductive elements 1712 (not shown in FIG. 17E-1) in sense pixels 1742 can be configured as single-ended or differential capacitive touch receive (sense) electrodes and connected to an AFE for capacitive touch sensing.)

FIG. 17E-2 is a symbolic illustration of four columns of conductive elements routed through a single column electrode of tiled sense pixels and configured as a single-ended capacitive touch receive (sense) electrode according to some examples of the disclosure. Although the example of FIG. 17E-2 shows A-D shorted together, any combination of one or more of A, B, C and D can be shorted together and connected to the inverting input of an AFE while the noninverting input of the AFE is connected to a reference voltage to perform single-ended capacitive touch sensing of a sense electrode in a mutual or self capacitive touch sensing system.

FIG. 17E-3 is a symbolic illustration of four columns of conductive elements routed through a single column electrode of tiled sense pixels and configured for performing two loop inductive stylus sensing according to some examples of the disclosure. In the example of FIGS. 17E-3, A and D are shorted together, while C can be connected to one input of an AFE, and B can be connected to the other input of the AFE to perform two-loop (two turn) inductive stylus sensing.

FIG. 17E-4 is a symbolic illustration of four columns of conductive elements routed through a single column electrode of tiled sense pixels and configured for performing two loop inductive stylus sensing with an active receive stylus according to some examples of the disclosure. In the example of FIGS. 17E-4, A and D are shorted together, B can be connected to the output of a current driver, and C can be connected to ground in a configuration similar to that shown in FIG. 8.

FIG. 17E-5 is a symbolic illustration of four columns of conductive elements routed through a single column electrode of tiled sense pixels and configured for performing two loop inductive stylus sensing with an active transmit stylus according to some examples of the disclosure. In the example of FIGS. 17E-5, A and D are shorted together, B can be connected to an input of a voltage detect amplifier, and C can be connected to ground in a configuration similar to that shown in FIG. 9.

It should be understood that although FIG. 17D and FIGS. 17E-1 through 17E-5 show only column electrode configurations, in other examples the row electrodes can be similarly configured.

Referring back to FIG. 16A, note that when vertically arranged conductive elements 1602-A and 1602-B are configured in a loop for inductive stylus sensing, the area within the loop is maximized because the current-carrying comb shafts 1628 are at the very outside edges of sense pixel 1632. In contrast, when horizontally arranged conductive elements 1612-A and 1612-B are configured in a loop for inductive stylus sensing, the area within the loop is not maximized for inductive stylus sensing because the current carrying comb shafts 1634 at the top and bottom of the horizontal conductive elements are not as far apart as they could be within the sense pixel, and therefore magnetic flux is not maximized.

Figure 18A:
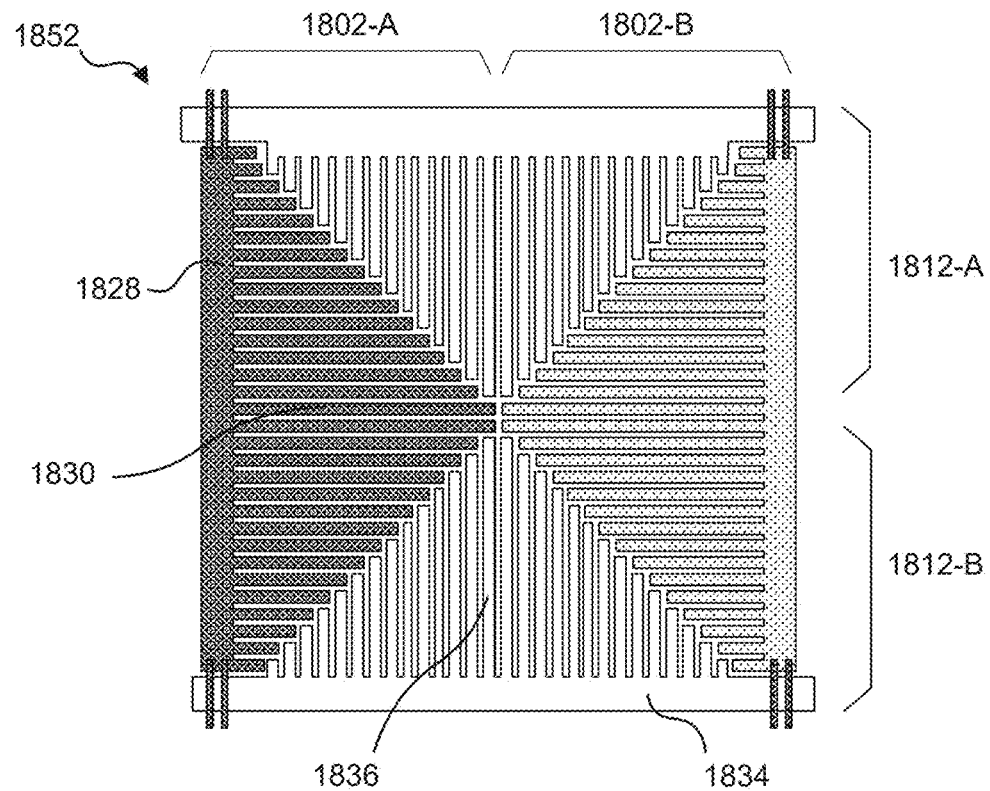
FIG. 18A illustrates a sense pixel configured for maximizing loop widths that can be replicated, tiled and configured for capacitive touch sensing and inductive stylus sensing according to some examples of the disclosure.

FIG. 18A illustrates a sense pixel 1852 configured for maximizing loop widths that can be replicated, tiled and configured for capacitive touch sensing and inductive stylus sensing according to some examples of the disclosure. Sense pixel 1852 in FIG. 18A is similar in some respects to sense pixel 1432 in FIG. 14, with a comb structure similar to that shown in FIG. 15B. In the example of FIG. 18A, sense pixel 1852 includes two vertically arranged conductive elements 1802-A and 1802-B. Each vertically arranged conductive element 1802 is formed from comb shaft 1828 and comb teeth 1830 extending from the comb shaft. Sense pixel 1852 also includes two horizontally arranged conductive elements 1812-A and 1812-B. Each horizontally arranged conductive element 1812 is formed from comb shaft 1834 and comb teeth 1836. In some examples, conductive elements 1802 and 1812 can be formed on the same layer, in which case vias may be utilized to connect to jumpers or bridges on another layer to enable the two elements to cross over each other without electrically connecting to each other. In other examples, conductive elements 1802 and 1812 can be formed on different layers, eliminating the need for crossover elements.

When configured for touch sensing, horizontally arranged conductive elements 1812-A and 1812-B can be driven with separate drive (stimulation) signals, where current primarily flows in comb shafts 1834 and not in comb teeth 1836. Vertically arranged conductive elements 1802-A and 1802-B can be sensed independently for touch sensing. When configured for inductive sensing, vertically arranged conductive elements 1802-A and 1802-B can be connected in a loop by an electrical connection formed in a controller chip. In one example where an AFE measurement circuit is connected to the vertical conductive elements at the bottom of FIG. 18A and the loop-forming electrical connection is made at the top, current can flow up comb shaft 1828 of vertical conductive element 1802-A and down the comb shaft of vertical conductive element 1802-B. A similar arrangement can also be applied to horizontally arranged conductive elements 1812-A and 1812-B, where they can be connected in a loop by an electrical connection formed in a controller chip.

Unlike FIG. 16A, horizontally arranged conductive elements 1812-A and 1812-B have current-carrying comb shafts 1834 that are spaced as far apart as possible within sense pixel 1752, thereby maximizing magnetic flux when the horizontal conductive elements are configured for inductive stylus sensing. In addition, comb teeth 1836 of horizontally arranged conductive elements 1812-A and 1812-B remain in close proximity to comb teeth 1830 of vertically arranged conductive elements 1802-A and 1802-B to provide good capacitive coupling between the two when performing capacitive touch sensing.

Figure 18B:
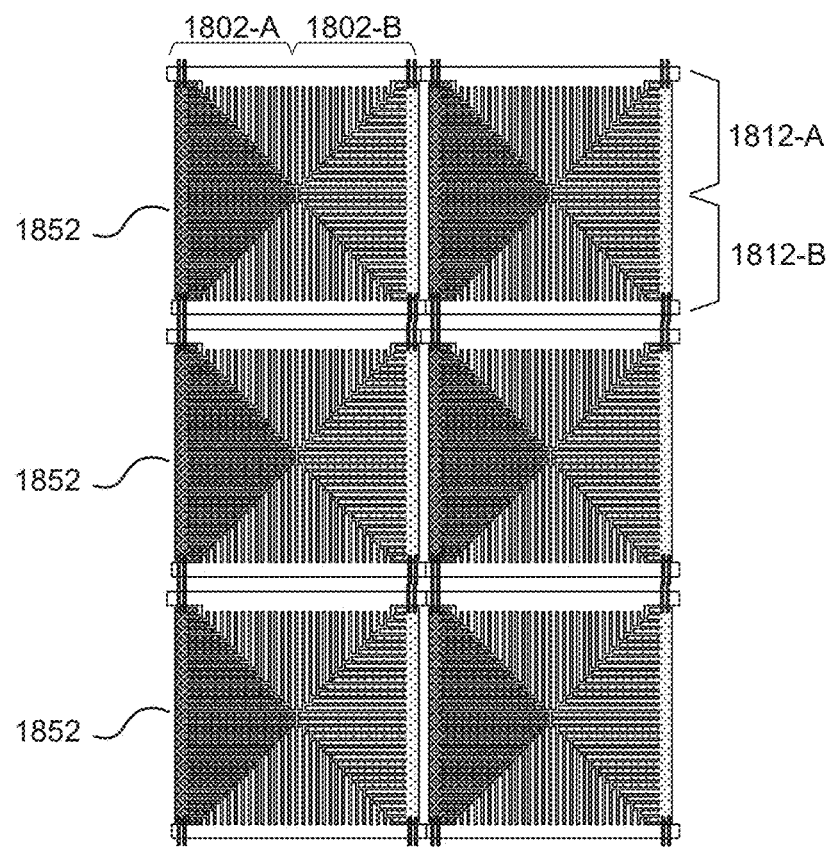
FIG. 18B illustrates a plurality of sense pixels tiled into columns and rows and configurable for performing either single-ended touch sensing or inductive stylus sensing according to some examples of the disclosure.

FIG. 18B illustrates a plurality of sense pixels 1852 tiled into columns and rows and configurable for performing either single-ended touch sensing or inductive stylus sensing according to some examples of the disclosure. When tiled, all vertically arranged conductive elements 1802-A in each column of tiled sense pixels 1852 can be electrically connected together, and all vertically arranged conductive elements 1802-B in each column can also be electrically connected together. In addition, all horizontally arranged conductive elements 1812-A in each row of tiled sense pixels 1852 can be electrically connected together, and all horizontally arranged conductive elements 1812-B in each row can also be electrically connected together.

Similar to FIG. 16A, the example of FIG. 18B can be configured to electrically connect vertically arranged conductive elements 1802-A and 1802-B together, and each of those elements can be selectively connectable to different inputs of an AFE in a controller. For example, vertically arranged conductive elements 1802-A and 1802-B can be electrically connected to a single input of the AFE (with its other input being held at a reference voltage, for example) for single-ended capacitive touch sensing. Alternatively, the ends of the loop formed by vertically arranged conductive elements 1802-A and 1802-B can be connected to separate inputs on the AFE for performing inductive loop sensing in the vertical direction. Horizontally arranged conductive elements 1812-A and 1812-B can be separately driven for capacitive touch sensing, or loops can be selectively formed by connections within the controller and measured by AFEs within the controller to perform inductive loop sensing in the horizontal direction.

Figure 19:
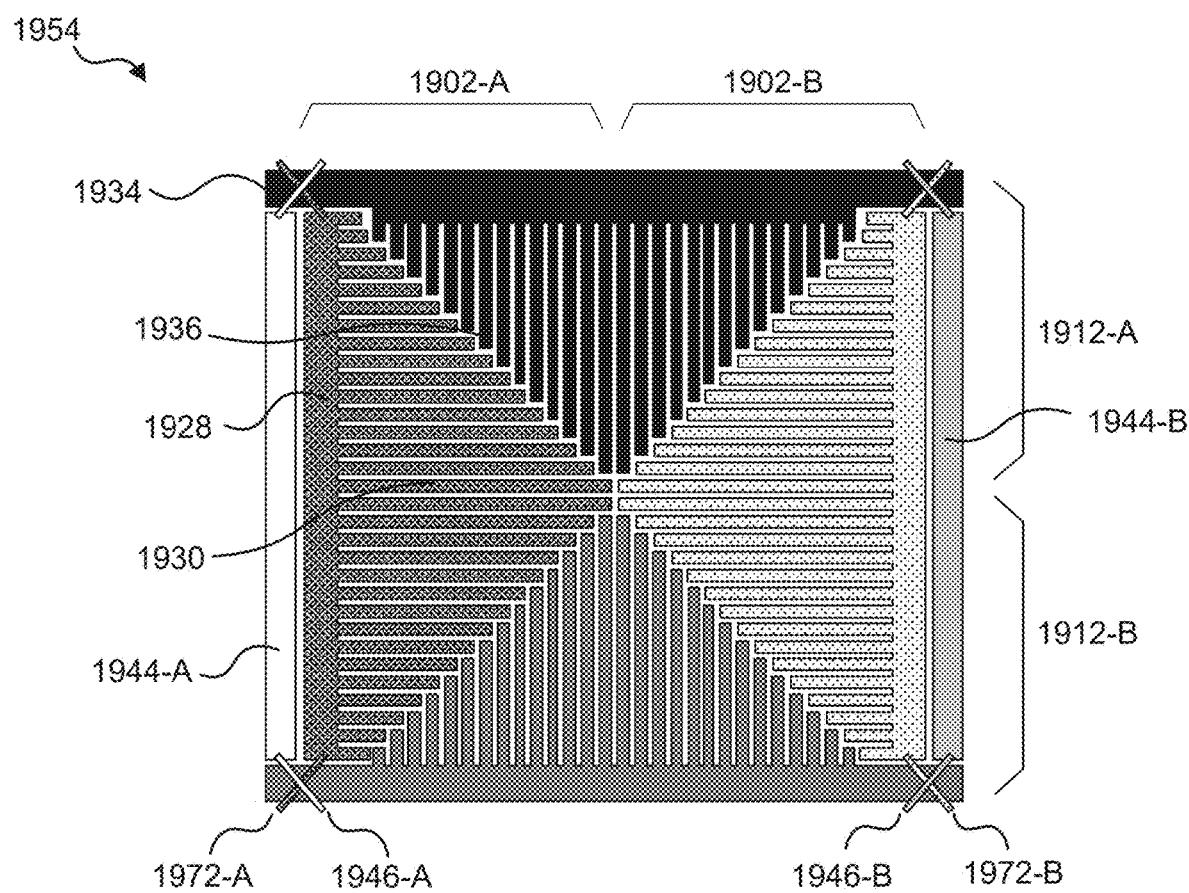
FIG. 19 illustrates a sense pixel that can be replicated, tiled and configured for capacitive touch sensing and inductive stylus sensing according to some examples of the disclosure.

FIG. 19 illustrates a sense pixel 1954 that can be replicated, tiled and configured for capacitive touch sensing and inductive stylus sensing according to some examples of the disclosure. Sense pixel 1954 in FIG. 19 is similar in some respects to sense pixel 1742-A in FIG. 17A and sense pixel 1852 in FIG. 18A. In the example of FIG. 19, sense pixel 1954 includes two vertically arranged conductive elements 1902-A and 1902-B. Each vertically arranged conductive element 1902-A and 1902-B is formed from comb shaft 1928 and comb teeth 1930 extending from the comb shaft. Sense pixel 1954 also includes two vertically oriented bypass conductive elements 1944-A and 1944-B. Bypass conductive element 1944-A includes bridges 1946-A at its top and bottom for providing electrical connections to adjacent sense pixels. Similarly, bypass conductive element 1944-B includes bridges 1946-B at its top and bottom for providing electrical connections to adjacent sense pixels. Sense pixel 1954 also includes two horizontally arranged conductive elements 1912-A and 1912-B. Each horizontally arranged conductive element 1912-A and 1912-B is formed from comb shaft 1934 and comb teeth 1936. In some examples, conductive elements 1902, 1912 and 1944 can be formed on the same layer, in which case vias may be utilized to connect to bridges 1972 or 1946 formed on another layer to enable the two bridges to cross over each other without electrically connecting to each other. In other examples, conductive elements 1902 and 1944 can be formed on different layers, eliminating the need for vias to connect to bridges 1972 or 1946. Sense pixel 1954 can be utilized along with a counterpart sense pixel (conceptually similar to sense pixel 1742-B in FIG. 17B, which is the counterpart to sense pixel 1742-A in FIG. 17A) and can be replicated, tiled and configured in a manner conceptually similar to FIGS. 17C-17E.

The preceding sense pixels were primarily described in the context of coplanar designs. However, process improvement such as thicker dielectrics and a lower RC process can enable multi-layer implementations, as discussed below.

Figure 20A:
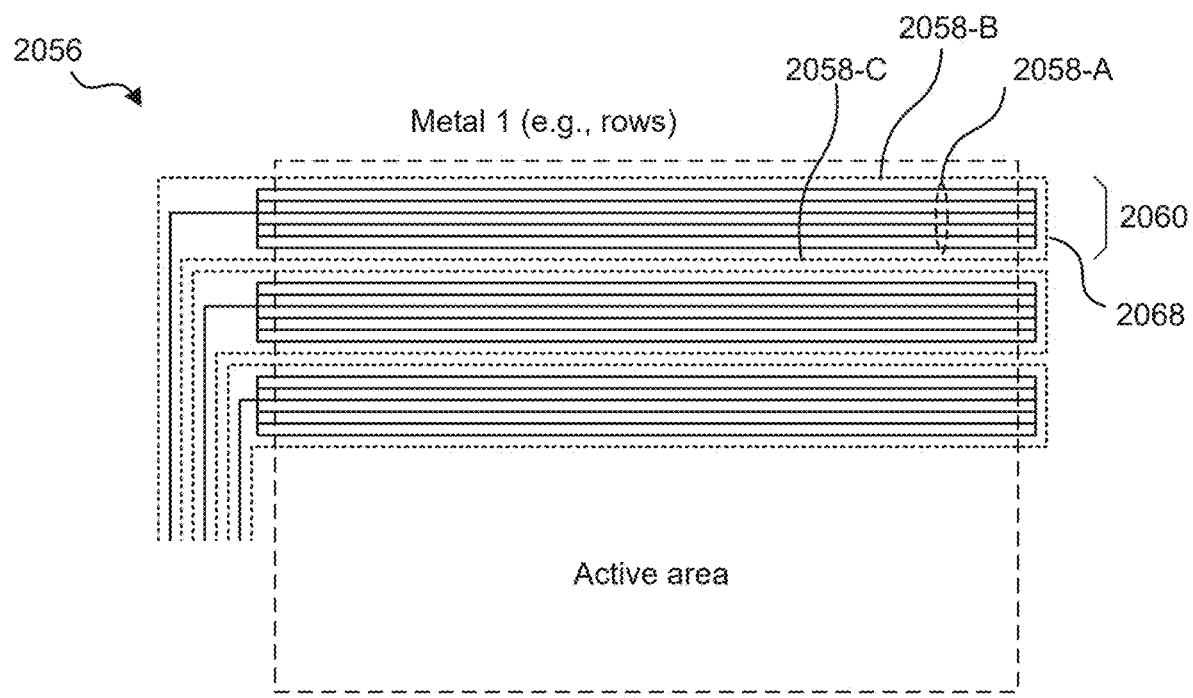
FIG. 20A illustrates a first layer of a multi-layer sensing area for performing capacitive touch sensing and inductive stylus sensing according to some examples of the disclosure.

FIG. 20A illustrates a first layer 2056 of a multi-layer sensing area for performing capacitive touch sensing and inductive stylus sensing according to some examples of the disclosure. In the example of FIG. 20A, a plurality of parallel horizontal conductive elements 2058-A can be electrically connected together at both ends to form a single row 2060 for capacitive touch sensing. In some examples, horizontal conductive elements 2058-A can be a metal mesh that does not support eddy current loops due to the current flow across the mesh, and the resistance of the mesh. Within each row 2060, two horizontally arranged conductive elements 2058-B and 2058-C can be electrically isolated from horizontally arranged conductive elements 2058-A and configured as shown in FIG. 20A to form row loop 2068. Because horizontally arranged conductive elements 2058-A do not support eddy currents, they will have minimal to no impact on the inductive sensing enabled by row loop 2068.

Figure 20B:
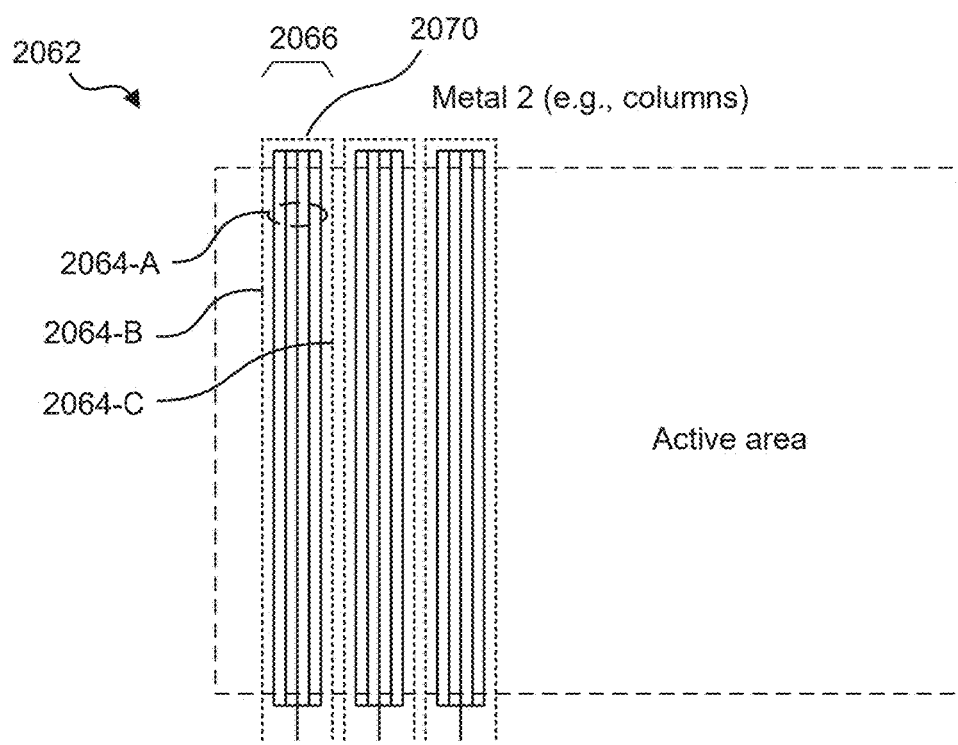
FIG. 20B illustrates a second layer of a multi-layer sensing area for performing capacitive touch sensing and inductive stylus sensing in conjunction with the first layer in FIG. 20A according to some examples of the disclosure.

FIG. 20B illustrates a second layer 2062 of a multi-layer sensing area for performing capacitive touch sensing and inductive stylus sensing in conjunction with first layer 2056 in FIG. 20A according to some examples of the disclosure. In the example of FIG. 20B, a plurality of parallel vertical conductive elements 2064-A can be electrically connected together at both ends to form a single column 2066 for capacitive touch sensing. In some examples, vertical conductive elements 2064-A can be a metal mesh that does not support eddy current loops due to the current flow across the mesh, and the resistance of the mesh. Within each column 2066, two vertical conductive elements 2064-B and 2064-C can be electrically isolated from vertical conductive elements 2064-A and configured as shown in FIG. 20B to form column loop 2070. Because vertical conductive elements 2064-A do not support eddy currents, they will have minimal to no impact on the inductive sensing enabled by column loop 2070.

When first layer 2056 of FIG. 20A and second layer 2062 of FIG. 20B are disposed over the active area of a sensing surface, the rows 2060 and columns 2066 can be configured in a controller chip as drive rows (or columns) and sense columns (or rows) for mutual capacitance touch sensing, or for sense rows and columns for self-capacitance touch sensing. Additionally, row loops 2068 and column loops 2070 can be configured for inductive stylus sensing.

Therefore, according to the above, some examples of the disclosure are directed to an apparatus configurable for capacitive touch sensing and inductive sensing, comprising a substrate and a plurality of sense pixels of conductive material disposed on the substrate and configured to form a plurality of first electrodes oriented in a first direction, wherein each first electrode is configurable for capacitive touch sensing and inductive sensing. Additionally or alternatively to one or more of the examples disclosed above, in some examples each first electrode is formed from a subset of the plurality of sense pixels. Additionally or alternatively to one or more of the examples disclosed above, in some examples each pixel of the plurality of sense pixels includes a plurality of conductive elements formed as a comb structure with a shaft and teeth extending from the shaft to maximize the capacitive touch sensing and inductive sensing. Additionally or alternatively to one or more of the examples disclosed above, in some examples each sense pixel of the plurality of sense pixels includes first and second conductive elements oriented in the first direction. Additionally or alternatively to one or more of the examples disclosed above, in some examples each of the first and second conductive elements are formed with a comb structure with a shaft and teeth extending from the shaft to maximize the capacitive touch sensing and inductive sensing. Additionally or alternatively to one or more of the examples disclosed above, in some examples each of the plurality of first electrodes is formed using a tiling of connected sense pixels. Additionally or alternatively to one or more of the examples disclosed above, in some examples each sense pixel of the plurality of sense pixels includes third and fourth conductive elements oriented in the first direction. Additionally or alternatively to one or more of the examples disclosed above, in some examples two of the first, second, third and fourth conductive elements are formed with a comb structure with a shaft and teeth extending from the shaft to maximize the capacitive touch sensing and inductive sensing. Additionally or alternatively to one or more of the examples disclosed above, in some examples the third and fourth conductive elements are bypass conductive elements. Additionally or alternatively to one or more of the examples disclosed above, in some examples the apparatus further comprises bridges coupled at opposite ends of each of the first, second, third and fourth conductive elements to provide electrical connections to adjacent sense pixels. Additionally or alternatively to one or more of the examples disclosed above, in some examples each of the plurality of first electrodes is formed using a tiling of sense pixels connected through their bridges. Additionally or alternatively to one or more of the examples disclosed above, in some examples for any directly connected first and second sense pixels in each of the first electrodes, the first conductive element of the first sense pixel is connected to the third conductive element of the second sense pixel via a first bridge, and the second conductive element of the first sense pixel is connected to the fourth conductive element of the second sense pixel via a second bridge. Additionally or alternatively to one or more of the examples disclosed above, in some examples the plurality of sense pixels are further configured to form a plurality of second electrodes oriented in a second direction, different from the first direction, wherein each second electrode is configurable for capacitive touch or inductive sensing. Additionally or alternatively to one or more of the examples disclosed above, in some examples each second electrode is formed from a subset of the plurality of sense pixels. Additionally or alternatively to one or more of the examples disclosed above, in some examples each sense pixel of the plurality of sense pixels includes third and fourth conductive elements oriented in the second direction. Additionally or alternatively to one or more of the examples disclosed above, in some examples each of the third and fourth conductive elements are formed with a comb structure with a shaft and teeth extending from the shaft to maximize the capacitive touch sensing and inductive sensing. Additionally or alternatively to one or more of the examples disclosed above, in some examples the shafts of the third and fourth conductive elements are located on opposite edges of each pixel in the plurality of pixels to maximize inductive sensing by being maximumly spaced apart from each other. Additionally or alternatively to one or more of the examples disclosed above, in some examples the apparatus further comprises a controller communicatively coupled to the plurality of first electrodes and configurable to connect the plurality of first electrodes for capacitive touch sensing, and configurable to connect the plurality of first electrodes in a plurality of loops for inductive sensing. Additionally or alternatively to one or more of the examples disclosed above, in some examples the controller is further configured for connecting the plurality of first electrodes to form each of the plurality of loops within individual first electrodes. Additionally or alternatively to one or more of the examples disclosed above, in some examples the controller is further configured to connect the first and second conductive elements together at a first end of each first electrode to form each of the plurality of loops within each first electrode. Additionally or alternatively to one or more of the examples disclosed above, in some examples the controller is further configured to connect the first and second conductive elements together and to an input of an amplifier at a second end of each first electrode for single-ended capacitive receive touch sensing. Additionally or alternatively to one or more of the examples disclosed above, in some examples the controller is further configured to connect the first and second conductive elements at a second end of each first electrode to first and second inputs of an amplifier for inductive sensing. Additionally or alternatively to one or more of the examples disclosed above, in some examples the apparatus further comprises a controller communicatively coupled to the plurality of first electrodes and configurable to connect the plurality of first electrodes for capacitive touch sensing, and configurable to connect the plurality of first electrodes in a plurality of loops for inductive sensing. Additionally or alternatively to one or more of the examples disclosed above, in some examples the controller is further configured for connecting the plurality of first electrodes to form each of the plurality of loops within individual first electrodes. Additionally or alternatively to one or more of the examples disclosed above, in some examples the controller is further configured to connect the first and second conductive elements together at a first end of each first electrode, and connect the third and fourth conductive elements together at the first end of each first electrode, to form each of the plurality of loops within each first electrode. Additionally or alternatively to one or more of the examples disclosed above, in some examples the controller is further configured to connect the first and second conductive elements together at a second end of each first electrode and to a first differential output of an amplifier, and connect the third and fourth conductive elements together at the second end of each first electrode and to a second differential output of the amplifier for differential transmit capacitive touch sensing. Additionally or alternatively to one or more of the examples disclosed above, in some examples the controller is further configured to connect the first and fourth conductive elements together at a second end of each first electrode, connect the second conductive element to a first differential input of an amplifier, and connect the third conductive element to a second differential input of the amplifier for two-turn inductive sensing. Additionally or alternatively to one or more of the examples disclosed above, in some examples the apparatus further comprises a controller communicatively coupled to the plurality of second electrodes and configurable to connect the plurality of second electrodes for capacitive touch sensing. Additionally or alternatively to one or more of the examples disclosed above, in some examples the controller is further configurable to connect the plurality of second electrodes in a plurality of loops for inductive sensing. Additionally or alternatively to one or more of the examples disclosed above, in some examples the controller is further configured for connecting the plurality of second electrodes to form each of the plurality of loops within individual second electrodes. Additionally or alternatively to one or more of the examples disclosed above, in some examples each of the plurality of first electrodes is a single pixel formed as a first bar of conductive material. Additionally or alternatively to one or more of the examples disclosed above, in some examples the apparatus further comprises a controller communicatively coupled to the plurality of first electrodes and configurable to connect pairs of the first electrodes in a plurality of loops for inductive sensing. Additionally or alternatively to one or more of the examples disclosed above, in some examples the plurality of pixels are further configured to form a plurality of second electrodes oriented in a second direction, different from the first direction, each of the plurality of second electrodes being a single pixel formed as a second bar of conductive material, wherein each second electrode is configurable for capacitive touch or inductive sensing. Additionally or alternatively to one or more of the examples disclosed above, in some examples the apparatus further comprises a controller communicatively coupled to the plurality of second electrodes and configurable to connect pairs of the second electrodes in a plurality of loops for inductive sensing.

Some examples of the disclosure are directed to an apparatus comprising a first layer comprising a plurality of groups of first conductive elements oriented in a first direction, wherein each group includes a first plurality of first conductive elements configured as a touch electrode, a second plurality of first conductive elements configured as a loop, and a controller connected to the plurality of groups of first conductive elements, wherein the controller is configured to connect the first plurality of first conductive elements within one or more groups for capacitive touch sensing in the first direction, and connect the second plurality of first conductive elements within one or more groups for inductive sensing in the first direction. Additionally or alternatively to one or more of the examples disclosed above, in some examples the apparatus further comprises a second layer comprising a plurality of groups of second conductive elements oriented in a second direction different from the first direction, wherein each group includes a first plurality of second conductive elements configured as a touch electrode, and a second plurality of second conductive elements configured as a loop. Additionally or alternatively to one or more of the examples disclosed above, in some examples the controller is connected to the plurality of groups of second conductive elements and is further configured to connect the first plurality of second conductive elements within one or more groups for capacitive touch sensing in the second direction, and connect the second plurality of second conductive elements within one or more groups for inductive sensing in the second direction.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An apparatus configurable for capacitive touch sensing and inductive sensing, comprising:
   a substrate; and
   a plurality of sense pixels of conductive material disposed on the substrate and configured to form a plurality of first electrodes oriented in a first direction,
   wherein each first electrode is configurable for capacitive touch sensing and inductive sensing,
   wherein the first electrodes are configurable to be connected in a plurality of loops for inductive sensing, and
   wherein one or more of the plurality of loops is formed by connecting a first portion of the first electrodes to a second portion of the first electrodes.

2. The apparatus of claim 1, wherein each first electrode is formed from a subset of the plurality of sense pixels.

3. The apparatus of claim 1, wherein each sense pixel of the plurality of sense pixels includes a plurality of conductive elements formed as a comb structure with a shaft and teeth extending from the shaft to maximize the capacitive touch sensing and inductive sensing.

4. The apparatus of claim 1, wherein each sense pixel of the plurality of sense pixels includes first and second conductive elements oriented in the first direction.

5. The apparatus of claim 4, wherein each of the first and second conductive elements are formed with a comb structure with a shaft and teeth extending from the shaft to maximize the capacitive touch sensing and inductive sensing.

6. The apparatus of claim 4, wherein each of the plurality of first electrodes is formed using a tiling of connected sense pixels.

7. The apparatus of claim 4, wherein each sense pixel of the plurality of sense pixels includes third and fourth conductive elements oriented in the first direction.

8. The apparatus of claim 7, wherein two of the first, second, third and fourth conductive elements are formed with a comb structure with a shaft and teeth extending from the shaft to maximize the capacitive touch sensing and inductive sensing.

9. The apparatus of claim 7, wherein the third and fourth conductive elements are bypass conductive elements.

10. The apparatus of claim 9, further comprising bridges coupled at opposite ends of each of the first, second, third and fourth conductive elements to provide electrical connections to adjacent sense pixels.

11. The apparatus of claim 10, wherein each of the plurality of first electrodes is formed using a tiling of sense pixels connected through their bridges.

12. The apparatus of claim 11, wherein for any directly connected first and second sense pixels in each of the first electrodes, the first conductive element of the first sense pixel is connected to the third conductive element of the second sense pixel via a first bridge, and the second conductive element of the first sense pixel is connected to the fourth conductive element of the second sense pixel via a second bridge.

13. The apparatus of claim 5, wherein the plurality of sense pixels are further configured to form a plurality of second electrodes oriented in a second direction, different from the first direction, wherein each second electrode is configurable for capacitive touch or inductive sensing.

14. The apparatus of claim 11, further comprising a controller communicatively coupled to the plurality of first electrodes and configurable to connect the plurality of first electrodes for capacitive touch sensing, and configurable to connect the plurality of first electrodes in the plurality of loops for inductive sensing.

15. The apparatus of claim 1, wherein each of the plurality of first electrodes is a single pixel formed as a first bar of conductive material.

16. The apparatus of claim 15, further comprising a controller communicatively coupled to the plurality of first electrodes and configurable to connect pairs of the first electrodes in the plurality of loops for inductive sensing.

17. The apparatus of claim 16, wherein the plurality of sense pixels are further configured to form a plurality of second electrodes oriented in a second direction, different from the first direction, each of the plurality of second electrodes being a single pixel formed as a second bar of conductive material, wherein each second electrode is configurable for capacitive touch or inductive sensing.

18. An apparatus comprising:
- a first layer comprising a plurality of groups of first conductive elements oriented in a first direction, wherein each group includes
  - a first plurality of first conductive elements configured as a touch electrode,
  - a second plurality of first conductive elements configured as a loop; and
- a controller connected to the plurality of groups of first conductive elements, wherein the controller is configured to
  - connect the first plurality of first conductive elements within one or more groups for capacitive touch sensing in the first direction, and
  - connect the second plurality of first conductive elements within one or more groups for inductive sensing in the first direction.

19. The apparatus of claim 18, further comprising:
- a second layer comprising a plurality of groups of second conductive elements oriented in a second direction different from the first direction, wherein each group includes
  - a first plurality of second conductive elements configured as a touch electrode, and
  - a second plurality of second conductive elements configured as a loop.

20. The apparatus of claim 19, wherein the controller is connected to the plurality of groups of second conductive elements and is further configured to:
- connect the first plurality of second conductive elements within one or more groups for capacitive touch sensing in the second direction; and
- connect the second plurality of second conductive elements within one or more groups for inductive sensing in the second direction.

* * * * *